(12) United States Patent
Huang et al.

(10) Patent No.: US 12,407,831 B2
(45) Date of Patent: Sep. 2, 2025

(54) METHOD, APPARATUS, AND MEDIUM FOR VIDEO PROCESSING

(71) Applicants: Beijing Bytedance Network Technology Co., Ltd., Beijing (CN); Bytedance Inc., Los Angeles, CA (US)

(72) Inventors: Yan Huang, Beijing (CN); Jizheng Xu, Los Angeles, CA (US); Li Zhang, Los Angeles, CA (US); Li Song, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 33 days.

(21) Appl. No.: 18/435,980

(22) Filed: Feb. 7, 2024

(65) Prior Publication Data
US 2024/0205415 A1    Jun. 20, 2024

Related U.S. Application Data

(63) Continuation of application No. PCT/CN2022/110366, filed on Aug. 4, 2022.

(30) Foreign Application Priority Data

Aug. 9, 2021  (WO) ................ PCT/CN2021/111635

(51) Int. Cl.
  *H04N 19/00*  (2014.01)
  *H04N 19/146*  (2014.01)
  *H04N 19/176*  (2014.01)

(52) U.S. Cl.
  CPC ......... *H04N 19/146* (2014.11); *H04N 19/176* (2014.11)

(58) Field of Classification Search
  CPC ..................................................... H04N 19/00
  See application file for complete search history.

(56) References Cited

U.S. PATENT DOCUMENTS

| 2010/0150168 A1 | 6/2010 | Chatterjee et al. |
| 2010/0166060 A1 | 7/2010 | Ezure et al. |
| (Continued) | | |

FOREIGN PATENT DOCUMENTS

| CN | 111010569 A | 4/2020 |

OTHER PUBLICATIONS

International Search Report in PCT/CN/2022/110366, mailed Nov. 7, 2022, 4 pages.

*Primary Examiner* — Maryam A Nasri
(74) *Attorney, Agent, or Firm* — Astute IP Law Group

(57) ABSTRACT

Embodiments of the present disclosure provide a solution for video processing. A method for video processing is proposed. The method comprises: determining, during a conversion between a target video block of a video and a bitstream of the video, an adjusted coding process for the target video block based at least in part on a budget of coding time for at least one further video block and an actual coding time for the at least one further video block, the at least one further video block being coded before the conversion, the coding time representing a time duration during which the at least one further video block being coded, the budget of coding time representing a time duration being pre-allocated for encoding the at least one further video block; and performing the conversion by using the adjusted coding process.

20 Claims, 11 Drawing Sheets

(56) References Cited

U.S. PATENT DOCUMENTS

2015/0281709 A1 10/2015 Bracha et al.
2017/0185455 A1* 6/2017 Le Bars ................ G06F 9/5044

* cited by examiner

METHOD, APPARATUS, AND MEDIUM FOR VIDEO PROCESSING

CROSS-REFERENCE TO RELATED APPLICATIONS

This application is a continuation of International Application No. PCT/CN2022/110366, filed on Aug. 4, 2022, which claims the benefit of International Application No. PCT/CN2021/111635 filed on Aug. 9, 2021. The entire contents of these applications are hereby incorporated by reference in their entireties.

FIELD

Embodiments of the present disclosure relates generally to video coding techniques, and more particularly, to coding process adjustment.

BACKGROUND

In nowadays, digital video capabilities are being applied in various aspects of peoples' lives. Multiple types of video compression technologies, such as MPEG-2, MPEG-4, ITU-TH.263, ITU-TH.264/MPEG-4 Part 10 Advanced Video Coding (AVC), ITU-TH.265 high efficiency video coding (HEVC) standard, versatile video coding (VVC) standard, have been proposed for video encoding/decoding. However, coding efficiency of conventional video coding techniques is generally very low, which is undesirable.

SUMMARY

Embodiments of the present disclosure provide a solution for video processing.

In a first aspect, a method for video processing is proposed. The method comprises: determining, during a conversion between a target video block of a video and a bitstream of the video, an adjusted coding process for the target video block based at least in part on a budget of coding time for at least one further video block and an actual coding time for the at least one further video block. The at least one further video block is coded before the conversion. The coding time represents a time duration during which the at least one further video block being coded. The budget of coding time represents a time duration being pre-allocated for encoding the at least one further video block. The method further comprises performing the conversion by using the adjusted coding process. Compared with the conventional solution, the proposed method can advantageously improve the coding effectiveness and coding efficiency.

In a second aspect, an apparatus for processing video data is proposed. The apparatus for processing video data comprises a processor and a non-transitory memory with instructions thereon, wherein the instructions upon execution by the processor, cause the processor to perform a method in accordance with the first aspect of the present disclosure.

In a third aspect, a non-transitory computer-readable storage medium is proposed. The non-transitory computer-readable storage medium storing instructions that cause a processor to perform a method in accordance with the first aspect of the present disclosure.

In a fourth aspect, another non-transitory computer-readable recording medium is proposed. The non-transitory computer-readable recording medium storing a bitstream of a video which is generated by a method performed by a video processing apparatus, wherein the method comprises: determining an adjusted encoding process for a target video block of the video based at least in part on a budget of encoding time for at least one further video block and an actual encoding time for the at least one further video block, the at least one further video block being encoded before the conversion, the encoding time representing a time duration during which the at least one further video block being encoded, the budget of encoding time representing a time duration being pre-allocated for encoding the at least one further video block; and generating the bitstream by using the adjusted encoding process.

In a fifth aspect, another method for video processing is proposed. The method for storing a bitstream of a video, comprising: determining an adjusted encoding process for a target video block of the video based at least in part on a budget of encoding time for at least one further video block and an actual encoding time for the at least one further video block, the at least one further video block being encoded before the conversion, the encoding time representing a time duration during which the at least one further video block being encoded, the budget of encoding time representing a time duration being pre-allocated for encoding the at least one further video block; generating the bitstream by using the adjusted encoding process; and storing the bitstream in a non-transitory computer-readable recording medium.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

Throughout the drawings, the same or similar reference numerals usually refer to the same or similar elements.

DETAILED DESCRIPTION

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Example Environment

Figure 1:
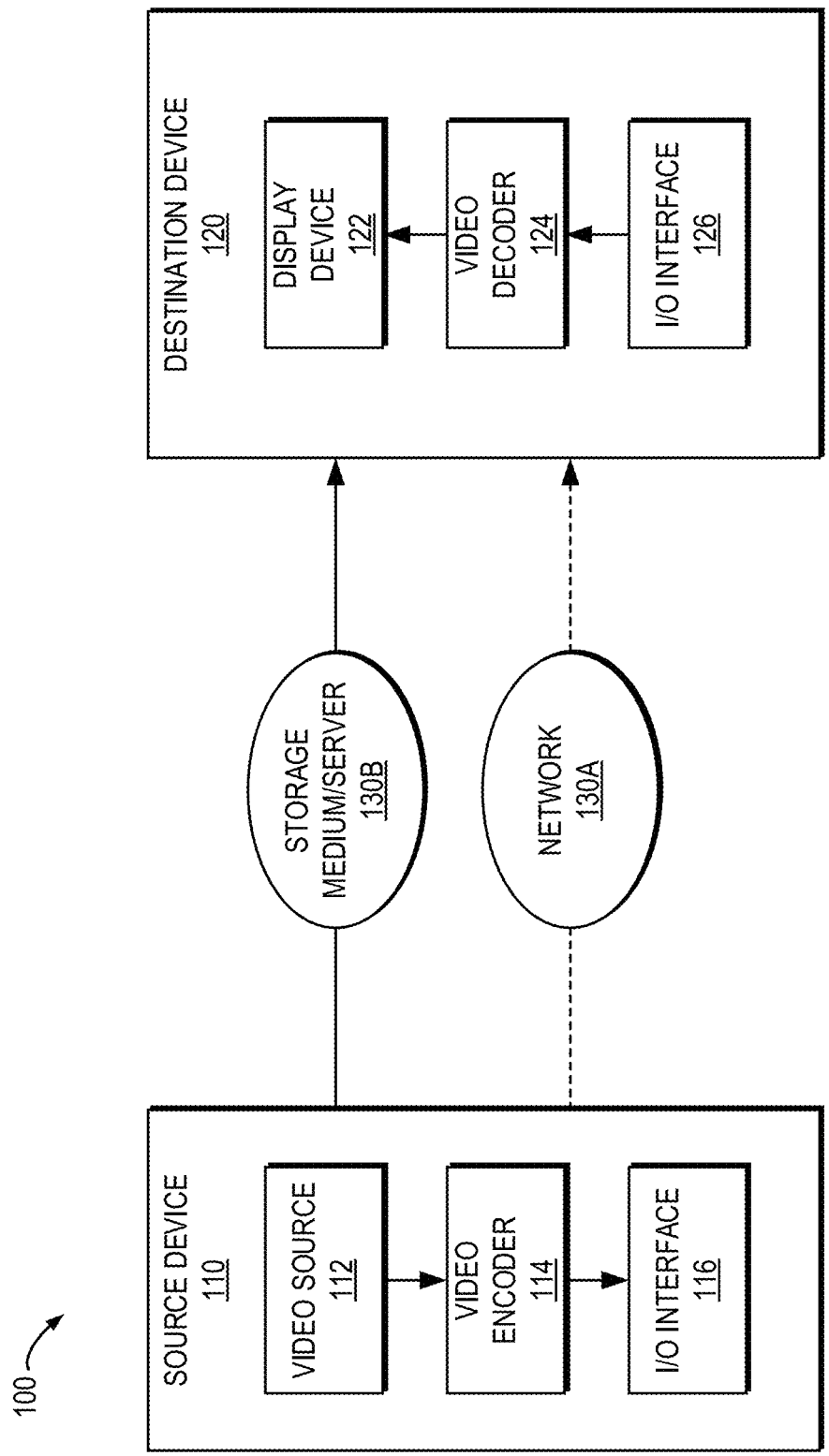
FIG. 1 illustrates a block diagram that illustrates an example video coding system, in accordance with some embodiments of the present disclosure.

FIG. 1 is a block diagram that illustrates an example video coding system 100 that may utilize the techniques of this disclosure. As shown, the video coding system 100 may include a source device 110 and a destination device 120. The source device 110 can be also referred to as a video encoding device, and the destination device 120 can be also referred to as a video decoding device. In operation, the source device 110 can be configured to generate encoded video data and the destination device 120 can be configured to decode the encoded video data generated by the source device 110. The source device 110 may include a video source 112, a video encoder 114, and an input/output (I/O) interface 116.

The video source 112 may include a source such as a video capture device. Examples of the video capture device include, but are not limited to, an interface to receive video data from a video content provider, a computer graphics system for generating video data, and/or a combination thereof.

The video data may comprise one or more pictures. The video encoder 114 encodes the video data from the video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. The I/O interface 116 may include a modulator/demodulator and/or a transmitter. The encoded video data may be transmitted directly to destination device 120 via the I/O interface 116 through the network 130A. The encoded video data may also be stored onto a storage medium/server 130B for access by destination device 120.

The destination device 120 may include an I/O interface 126, a video decoder 124, and a display device 122. The I/O interface 126 may include a receiver and/or a modem. The I/O interface 126 may acquire encoded video data from the source device 110 or the storage medium/server 130B. The video decoder 124 may decode the encoded video data. The display device 122 may display the decoded video data to a user. The display device 122 may be integrated with the destination device 120, or may be external to the destination device 120 which is configured to interface with an external display device.

The video encoder 114 and the video decoder 124 may operate according to a video compression standard, such as the High Efficiency Video Coding (HEVC) standard, Versatile Video Coding (VVC) standard and other current and/or further standards.

Figure 2:
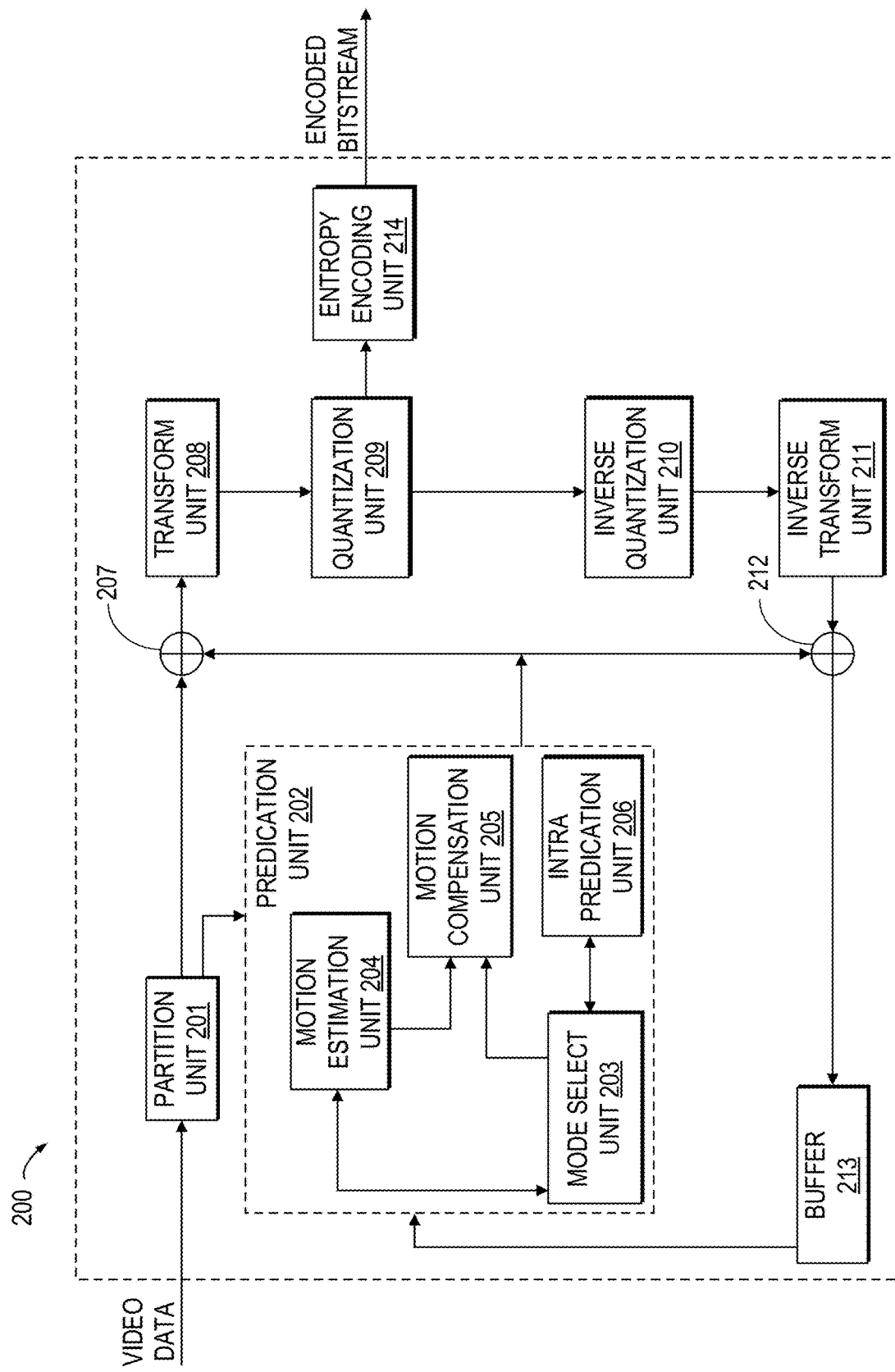
FIG. 2 illustrates a block diagram that illustrates a first example video encoder, in accordance with some embodiments of the present disclosure.

FIG. 2 is a block diagram illustrating an example of a video encoder 200, which may be an example of the video encoder 114 in the system 100 illustrated in FIG. 1, in accordance with some embodiments of the present disclosure.

The video encoder 200 may be configured to implement any or all of the techniques of this disclosure. In the example of FIG. 2, the video encoder 200 includes a plurality of functional components. The techniques described in this disclosure may be shared among the various components of the video encoder 200. In some examples, a processor may be configured to perform any or all of the techniques described in this disclosure.

In some embodiments, the video encoder 200 may include a partition unit 201, a predication unit 202 which may include a mode select unit 203, a motion estimation unit 204, a motion compensation unit 205 and an intra-prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, the video encoder 200 may include more, fewer, or different functional components. In an example, the predication unit 202 may include an intra block copy (IBC) unit. The IBC unit may perform predication in an IBC mode in which at least one reference picture is a picture where the current video block is located.

Furthermore, although some components, such as the motion estimation unit 204 and the motion compensation unit 205, may be integrated, but are represented in the example of FIG. 2 separately for purposes of explanation.

The partition unit 201 may partition a picture into one or more video blocks. The video encoder 200 and the video decoder 300 may support various video block sizes.

The mode select unit 203 may select one of the coding modes, intra or inter, e.g., based on error results, and provide the resulting intra-coded or inter-coded block to a residual generation unit 207 to generate residual block data and to a reconstruction unit 212 to reconstruct the encoded block for use as a reference picture. In some examples, the mode select unit 203 may select a combination of intra and inter predication (CIIP) mode in which the predication is based on an inter predication signal and an intra predication signal. The mode select unit 203 may also select a resolution for a motion vector (e.g., a sub-pixel or integer pixel precision) for the block in the case of inter-predication.

To perform inter prediction on a current video block, the motion estimation unit 204 may generate motion information for the current video block by comparing one or more reference frames from buffer 213 to the current video block. The motion compensation unit 205 may determine a predicted video block for the current video block based on the motion information and decoded samples of pictures from the buffer 213 other than the picture associated with the current video block.

The motion estimation unit 204 and the motion compensation unit 205 may perform different operations for a current video block, for example, depending on whether the current video block is in an I-slice, a P-slice, or a B-slice. As used herein, an "I-slice" may refer to a portion of a picture composed of macroblocks, all of which are based upon macroblocks within the same picture. Further, as used herein, in some aspects, "P-slices" and "B-slices" may refer to portions of a picture composed of macroblocks that are not dependent on macroblocks in the same picture.

In some examples, the motion estimation unit 204 may perform uni-directional prediction for the current video block, and the motion estimation unit 204 may search reference pictures of list 0 or list 1 for a reference video block for the current video block. The motion estimation unit 204 may then generate a reference index that indicates the reference picture in list 0 or list 1 that contains the reference video block and a motion vector that indicates a spatial displacement between the current video block and the reference video block. The motion estimation unit 204 may output the reference index, a prediction direction indicator, and the motion vector as the motion information of the current video block. The motion compensation unit 205 may generate the predicted video block of the current video block based on the reference video block indicated by the motion information of the current video block.

Alternatively, in other examples, the motion estimation unit 204 may perform bi-directional prediction for the current video block. The motion estimation unit 204 may search the reference pictures in list 0 for a reference video block for the current video block and may also search the reference pictures in list 1 for another reference video block for the current video block. The motion estimation unit 204 may then generate reference indexes that indicate the reference pictures in list 0 and list 1 containing the reference video blocks and motion vectors that indicate spatial displacements between the reference video blocks and the current video block. The motion estimation unit 204 may output the reference indexes and the motion vectors of the current video block as the motion information of the current video block. The motion compensation unit 205 may generate the predicted video block of the current video block based on the reference video blocks indicated by the motion information of the current video block.

In some examples, the motion estimation unit 204 may output a full set of motion information for decoding processing of a decoder. Alternatively, in some embodiments, the motion estimation unit 204 may signal the motion information of the current video block with reference to the motion information of another video block. For example, the motion estimation unit 204 may determine that the motion information of the current video block is sufficiently similar to the motion information of a neighboring video block.

In one example, the motion estimation unit 204 may indicate, in a syntax structure associated with the current video block, a value that indicates to the video decoder 300 that the current video block has the same motion information as the another video block.

In another example, the motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

The intra prediction unit 206 may perform intra prediction on the current video block. When the intra prediction unit 206 performs intra prediction on the current video block, the intra prediction unit 206 may generate prediction data for the current video block based on decoded samples of other video blocks in the same picture. The prediction data for the current video block may include a predicted video block and various syntax elements.

The residual generation unit 207 may generate residual data for the current video block by subtracting (e.g., indicated by the minus sign) the predicted video block (s) of the current video block from the current video block. The residual data of the current video block may include residual video blocks that correspond to different sample components of the samples in the current video block.

In other examples, there may be no residual data for the current video block for the current video block, for example in a skip mode, and the residual generation unit 207 may not perform the subtracting operation.

The transform processing unit 208 may generate one or more transform coefficient video blocks for the current video block by applying one or more transforms to a residual video block associated with the current video block.

After the transform processing unit 208 generates a transform coefficient video block associated with the current video block, the quantization unit 209 may quantize the transform coefficient video block associated with the current video block based on one or more quantization parameter (QP) values associated with the current video block.

The inverse quantization unit 210 and the inverse transform unit 211 may apply inverse quantization and inverse transforms to the transform coefficient video block, respectively, to reconstruct a residual video block from the transform coefficient video block. The reconstruction unit 212 may add the reconstructed residual video block to corresponding samples from one or more predicted video blocks generated by the predication unit 202 to produce a reconstructed video block associated with the current video block for storage in the buffer 213.

After the reconstruction unit 212 reconstructs the video block, loop filtering operation may be performed to reduce video blocking artifacts in the video block.

The entropy encoding unit 214 may receive data from other functional components of the video encoder 200. When the entropy encoding unit 214 receives the data, the entropy encoding unit 214 may perform one or more entropy encoding operations to generate entropy encoded data and output a bitstream that includes the entropy encoded data.

Figure 3:
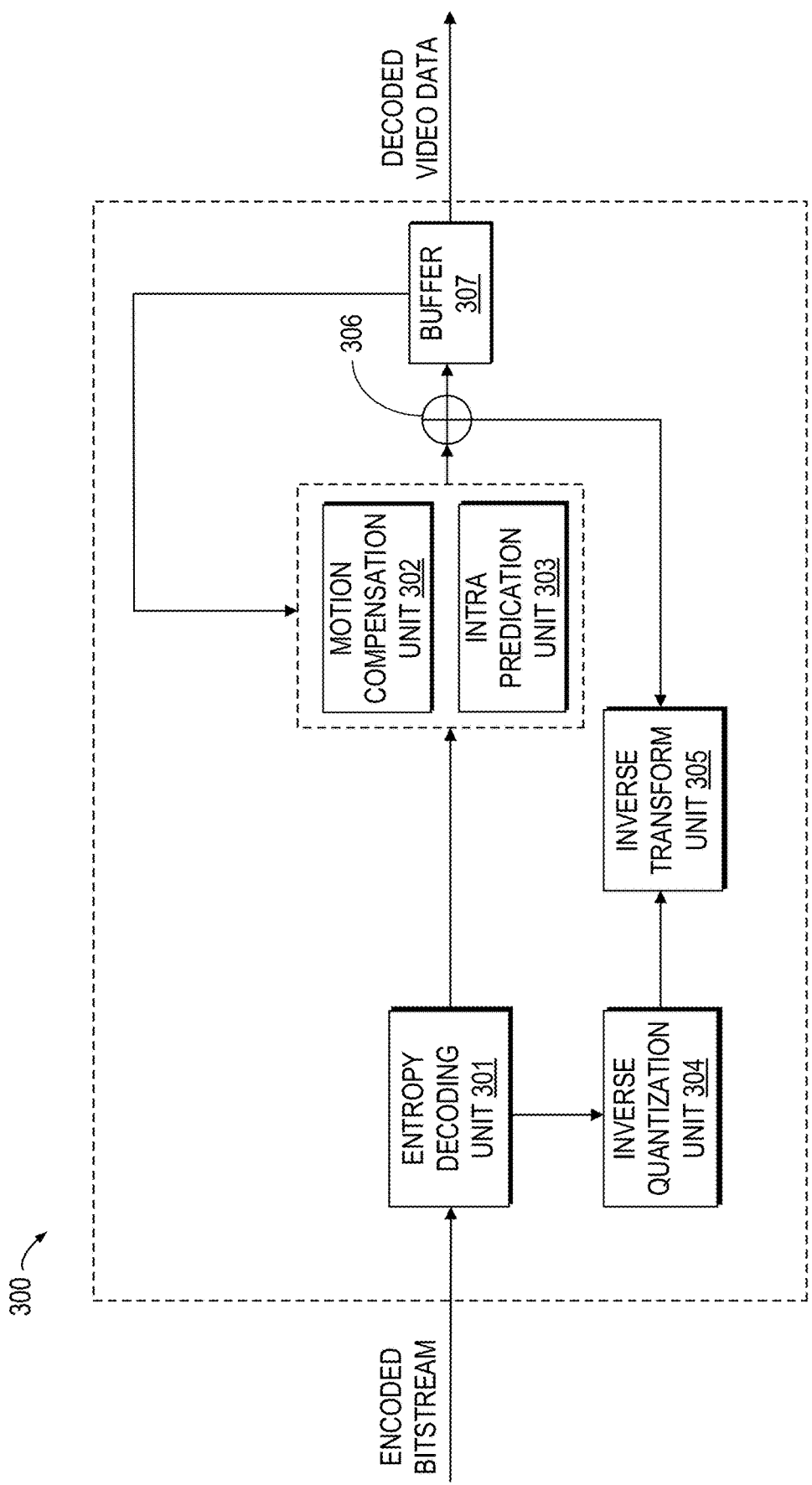
FIG. 3 illustrates a block diagram that illustrates an example video decoder, in accordance with some embodiments of the present disclosure.

FIG. 3 is a block diagram illustrating an example of a video decoder 300, which may be an example of the video decoder 124 in the system 100 illustrated in FIG. 1, in accordance with some embodiments of the present disclosure.

The video decoder 300 may be configured to perform any or all of the techniques of this disclosure. In the example of FIG. 3, the video decoder 300 includes a plurality of functional components. The techniques described in this disclosure may be shared among the various components of the video decoder 300. In some examples, a processor may be configured to perform any or all of the techniques described in this disclosure.

In the example of FIG. 3, the video decoder 300 includes an entropy decoding unit 301, a motion compensation unit 302, an intra prediction unit 303, an inverse quantization unit 304, an inverse transformation unit 305, and a reconstruction unit 306 and a buffer 307. The video decoder 300 may, in some examples, perform a decoding pass generally reciprocal to the encoding pass described with respect to video encoder 200.

The entropy decoding unit 301 may retrieve an encoded bitstream. The encoded bitstream may include entropy coded video data (e.g., encoded blocks of video data). The entropy decoding unit 301 may decode the entropy coded video data, and from the entropy decoded video data, the motion compensation unit 302 may determine motion information including motion vectors, motion vector precision, reference picture list indexes, and other motion information. The motion compensation unit 302 may, for example, determine such information by performing the AMVP and merge mode. AMVP is used, including derivation of several most probable candidates based on data from adjacent PBs and the reference picture. Motion information typically includes the horizontal and vertical motion vector displacement values, one or two reference picture indices, and, in the case of prediction regions in B slices, an identification of which reference picture list is associated with each index. As used herein, in some aspects, a "merge mode" may refer to deriving the motion information from spatially or temporally neighboring blocks.

The motion compensation unit 302 may produce motion compensated blocks, possibly performing interpolation based on interpolation filters. Identifiers for interpolation filters to be used with sub-pixel precision may be included in the syntax elements.

The motion compensation unit 302 may use the interpolation filters as used by the video encoder 200 during encoding of the video block to calculate interpolated values for sub-integer pixels of a reference block. The motion compensation unit 302 may determine the interpolation filters used by the video encoder 200 according to the received syntax information and use the interpolation filters to produce predictive blocks.

The motion compensation unit 302 may use at least part of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence. As used herein, in some aspects, a "slice" may refer to a data structure that can be decoded independently from other slices of the same picture, in terms of entropy coding, signal prediction, and residual signal reconstruction. A slice can either be an entire picture or a region of a picture.

The intra prediction unit 303 may use intra prediction modes for example received in the bitstream to form a prediction block from spatially adjacent blocks. The inverse quantization unit 304 inverse quantizes, i.e., de-quantizes, the quantized video block coefficients provided in the bitstream and decoded by entropy decoding unit 301. The inverse transform unit 305 applies an inverse transform.

The reconstruction unit 306 may obtain the decoded blocks, e.g., by summing the residual blocks with the corresponding prediction blocks generated by the motion compensation unit 302 or intra-prediction unit 303. If desired, a deblocking filter may also be applied to filter the decoded blocks in order to remove blockiness artifacts. The decoded video blocks are then stored in the buffer 307, which provides reference blocks for subsequent motion compensation/intra predication and also produces decoded video for presentation on a display device.

Some exemplary embodiments of the present disclosure will be described in detailed hereinafter. It should be understood that section headings are used in the present document to facilitate ease of understanding and do not limit the embodiments disclosed in a section to only that section. Furthermore, while certain embodiments are described with reference to Versatile Video Coding or other specific video codecs, the disclosed techniques are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

1. SUMMARY

This disclosure is related to video coding technologies. Specifically, it is about encoding complexity control in video coding. The ideas may be applied individually or in various combinations, to any video coding standard, e.g., the Versatile Video Coding (VVC) or non-standard video codec.

2. ABBREVIATIONS

AI All Intra
RA Random Access
AVC Advanced Video Coding
HEVC High Efficiency Video Coding
VVC Versatile Video Coding
VCEG Video Coding Experts Group
MPEG Moving Picture Experts Group
QTMT QuadTree with nested Multi-type Tree
SIMD Single Instruction Multiple Data
CTU Coding Tree Unit
VTM VVC Test Model
QP Quantization Parameter
RD Rate Distortion
GOP Group Of Pictures
TID Temporal ID
SATD Sum of Absolute Transformed Differences
CU Coding Unit
PU Prediction Unit
QT QuadTree
BT Binary Tree
MT Multi-type Tree
BDBR Bjøntegaard Delta Bit-Rate
TS Time Saving

3. BACKGROUND

Through the development of the joint collaborative team of ITU-T Video Coding Experts Group (VCEG) and ISO/IEC Moving Picture Experts Group (MPEG), video coding standards have evolved and iterated continuously. Every ten years, a new generation of video coding standard that integrated the most advanced technologies at that time emerges. H.262/MPEG-2, H.264/MPEG-4 Advanced Video Coding (AVC), H.265/High Efficiency Video Coding (HEVC) and H.266/Versatile Video Coding (VVC) bring together the most representative technologies of the era. For example, the hybrid video coding structure in H.262, and the continuously renewed coding tools including block partitioning, intra prediction, inter prediction, transform, entropy coding and in-loop filters during the development of AVC, HEVC and VVC. Although for each new generation of video coding standard, about 50% of bitrate saving is achieved, more sophisticated algorithm design, for example, more complex partitioning strategies in Coding Tree Unit (CTU), also led to encoding time several times over. The encoding computational complexity of HEVC is higher than AVC High Profile by a factor of 5. Although Single Instruction Multiple Data (SIMD) is integrated and enabled in VVC, VVC encoding time is still on average 10.2 times higher than HEVC's under Random Access (RA) setting. As for All Intra (AI) setting, the complexity is even increased by a factor of 31. Encoding complexity is gradually becoming a more obvious barrier for wide deployment and use of video coding standards, especially for AI setting. To deal with the problem, complexity reduction is the commonly used method.

Generally, complexity reduction methods choose to skip some brute-force searching to realize encoding time saving. Take VVC as an example, currently most of the research focuses on complexity reduction of some modules, skipping full search of quadtree with nested multi-type tree (QTMT) partition process, fast Intra mode decision, and fast multiple transform selection. Actually, a series of complexity reduction algorithms are also discussed during the JVET development, some of which have been adopted in the VVC test model (VTM). However, complexity reduction algorithms may not solve the problem in practice. There are two reasons. First, complexity reduction algorithms ordinarily only have several discrete configurations. So it is not flexible enough to meet the demand of a resource constraint application whose target encoding time is between two configurations. Second, for different video content and Quantization Parameter (QP), the performance of complexity reduction is not stable. For the same algorithm, a huge difference of time saving and rate distortion (RD) loss could appear on different sequences. Therefore, to realize a randomly chosen encoding time achievable for each sequence and each QP, complexity control is a must to fill the gap between demands and fast encoding algorithms.

4. PROBLEMS

The existing designs for video encoding complexity control have the following problems:
1. Complexity reduction methods appear more frequently, while a benchmark method is lacked to realize video encoding complexity control, especially for VVC.
2. Currently, the existing complexity control mechanisms are tightly coupled with the design of fast algorithms. It's hard to extend the complexity control method from one video coding standard to another.
3. The complexity control accuracy (evaluated by encoding time error) is not satisfactory.
4. A significant RD degradation compared to the complexity reduction method will appear when adopting the complexity control method.

5. DESCRIPTIONS

To solve the above problems and some other problems not mentioned, methods, as summarized below, are disclosed. The embodiments should be considered as examples to explain the general concepts and should not be interpreted in a narrow way. Furthermore, these embodiments can be applied individually or combined in any manner.

Figure 4:
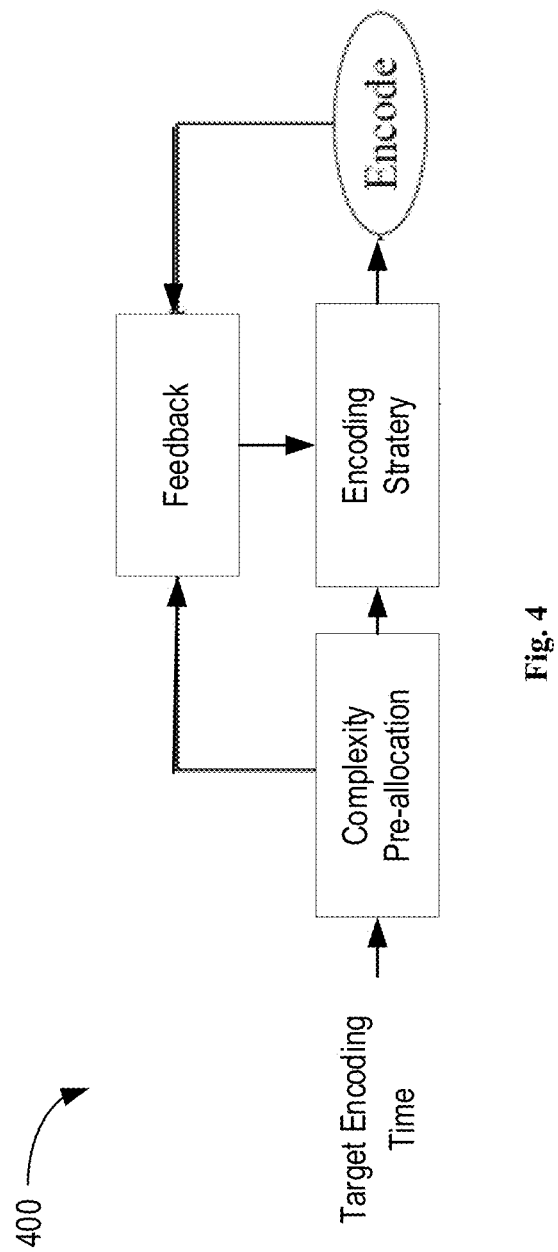
FIG. 4 illustrates a schematic diagram illustrating the relationship of the three modules used in the coding process adjustment in accordance with some embodiments of the present disclosure.

A video encoding complexity control scheme is designed wherein it deploys three major modules: complexity pre-allocation, a feedback mechanism to realize one-pass encoding complexity (more specifically, encoding time) control and encoding strategy decision. FIG. 4 illustrates a schematic diagram 400 illustrating the relationship of the three modules used in the encoding process adjustment in accordance with some embodiments of the present disclosure. The relationship of the mentioned three modules is illustrated in FIG. 4. Wherein complexity is conducted before the encoding process. Then the feedback mechanism functions according to the pre-allocated complexity and the actual encoding time. Finally, the complexity pre-allocated module and the feedback module will jointly decide the encoding strategy for the following video units/Frames/GOPs to be coded. The strategies in each module can be modified according to the usage scenario.

On Complexity Pre-Allocation
1) Unreasonable encoding complexity allocation could make the encoding time budget not achievable, which could cause significant RD loss for some video units. A weighted encoding budget pre-allocation method is therefore designed.

a. In one example, the pre-allocation may consist of three stages, i.e., segment stage, frame stage and video unit stage.
   i. In one example, in the segment stage, the sequence encoding budget will be allocated to each segment. One segment will have one or more GOPs. The segment budget may be dependent on the number of GOP/frames.
   ii. In one example, in the frame stage, the GOP budget will be allocated to each frame.
      1. In one example, the weight of each frame may be dependent on the coded information, such as slice/picture type, QP, etc. al.
      2. Alternatively, the weight may be updated on the fly.
   iii. In one example, in the video unit stage, the frame budget will be allocated to each video unit.
      1. In one example, the weight of each video unit may be dependent on the calculated intermediate feature, such as gradient/variance/SATD cost, etc. al.
      2. Alternatively, the weight may be dependent on the coded information, such as spatial/temporal neighboring video units or similar video units that can be historically traced.

On Feedback Mechanism

2) A feedback mechanism is designed, which could help keep the accuracy property of the method.
   a. In one example, video unit-level (e.g., one video unit is a CTU) encoding time will be collected and compared with the video unit-level budget after the encoding process, which will help update the video unit-level encoding budget consuming status, namely joint budget status.
   b. Alternatively, furthermore, Slice/Tile/Frame/GOP-level actual encoding time may be collected to update the joint budget status.
3) Through the joint consideration of encoding time budget and encoding time error, the feedback may in a manner of either an acceleration ratio or the encoding strategy adjustment direction for the following video units.
   a. In one example, a model-based encoding time reallocation method is designed. Wherein the encoding time deviation will be utilized to reallocate the encoding time budget. Then along with the estimated original encoding time, the encoding time budget will be converted to an acceleration ratio. Then, the acceleration ratio may be used to determine the encoding strategy.
      i. In one example, the above-mentioned encoding time deviation (namely time error) may be maintained at video unit-level, the accumulated error will be evenly or unevenly distributed over the next few video units.
      ii. Alternatively, the time error may be maintained in frame/GOP-level. The accumulated error will be evenly or unevenly distributed over the next few frames/GOPs.
      iii. In one example, the above-mentioned estimated original encoding time may be based on a Time-Cost model. Wherein the encoding time will be estimated through the cost available, such as SATD cost or Planar cost.
         1. In one example, the model may be defined as the $\alpha*CTUcost^{\beta}$ wherein $\alpha$ and $\beta$ are two parameters.
         2. In one example, the model may be defined as the $\alpha*CTUcost^{\beta}+\gamma$ wherein $\alpha$, $\beta$, $\gamma$ are three parameters.
   b. Alternatively, a status-based encoding strategy adjustment method is designed. Wherein the total budget consuming status, including the target budget consuming ratio and the actual one, are combined to calculate the current encoding speed, then the speed will be utilized to modify the encoding strategy adjustment direction.

On Encoding Strategy

4) For the encoding strategy decision module, one or more factors will be used. Wherein each factor will have multiple encoding configurations. The combination of the configurations of factors will have a different impact on encoding time and RD loss.
   a. In one example, the maximum partition depth is the only factor. The wide existence of the partition process makes it easy to be extended to different video coding standards, for example, VVC, HEVC and video coding settings, including Intra and Inter.
      i. In one example, for VVC, the maximum partition depth can be QuadTree (QT)/Multi-type Tree (MT)/Binary Tree (BT) by oneself
      ii. Alternatively, for VVC, the maximum depth can be QT/MT/BT combination
   b. Alternatively, the minimum partition depth can be taken into consideration as a factor.
   c. Alternatively, other encoding tools, including Intra/Inter/IBC/palette prediction mode, motion estimation range, can be considered as factors as well.
5) Then a Pareto-based method is designed to generate the most Rate-Distortion-Complexity effective encoding strategies, i.e., presets, from the combination of the factors.
   a. In one example, all configurations of the factors are combined to evaluate the encoding performance. One or more configurations with the best performance with respect to time saving and RD loss will be selected as candidate strategies, i.e., presets.
      i. In one example, the presets will be arranged in order, for example, RD loss increasing order.
   b. Furthermore, with the offline-trained presets obtained, a lookup table may be derived.
      i. In one example, the lookup table may contain all presets. For each preset, configuration of each factor, the corresponding encoding time saving ratio, the corresponding RD loss.
6) Then according to the manner of the feedback, the encoding strategy decision is conducted through determining which preset to use for the following video units.
   a. In one example, an acceleration ratio is obtained from the feedback module.
      i. In one example, the lookup table will be utilized to find the corresponding preset whose acceleration ratio is closest to the target acceleration ratio.
   b. Alternatively, the encoding strategy adjustment direction is obtained from the feedback module.
      i. In one example, all the presets will be available. A threshold thr is utilized to decide to choose a faster or a slower preset.
      ii. Alternatively, several presets will be available. Correspondingly, another threshold thr2 is utilized to adjust the presets available to a faster/slower range.

1. In one example, the presets could be several consecutive ones. For example, [Preset$_{min}$, Preset$_{max}$] is designed to constrain the preset range.
2. Alternatively, the presets could be inconsecutive.

iii. For the above thresholds, an empirical fixed one or alternatively, an elastic one according to encoding progress is designed.
1. In one example, the encoding progress may be the ratio of video units/Frames/GOPs not encoded, i.e. $r_b$.
2. In one example, the elastic threshold is designed as thr2=thr+$\delta$(1−$r_b$) wherein $\delta$ is a parameter in range (0,1)

6. EMBODIMENTS

Figure 5:
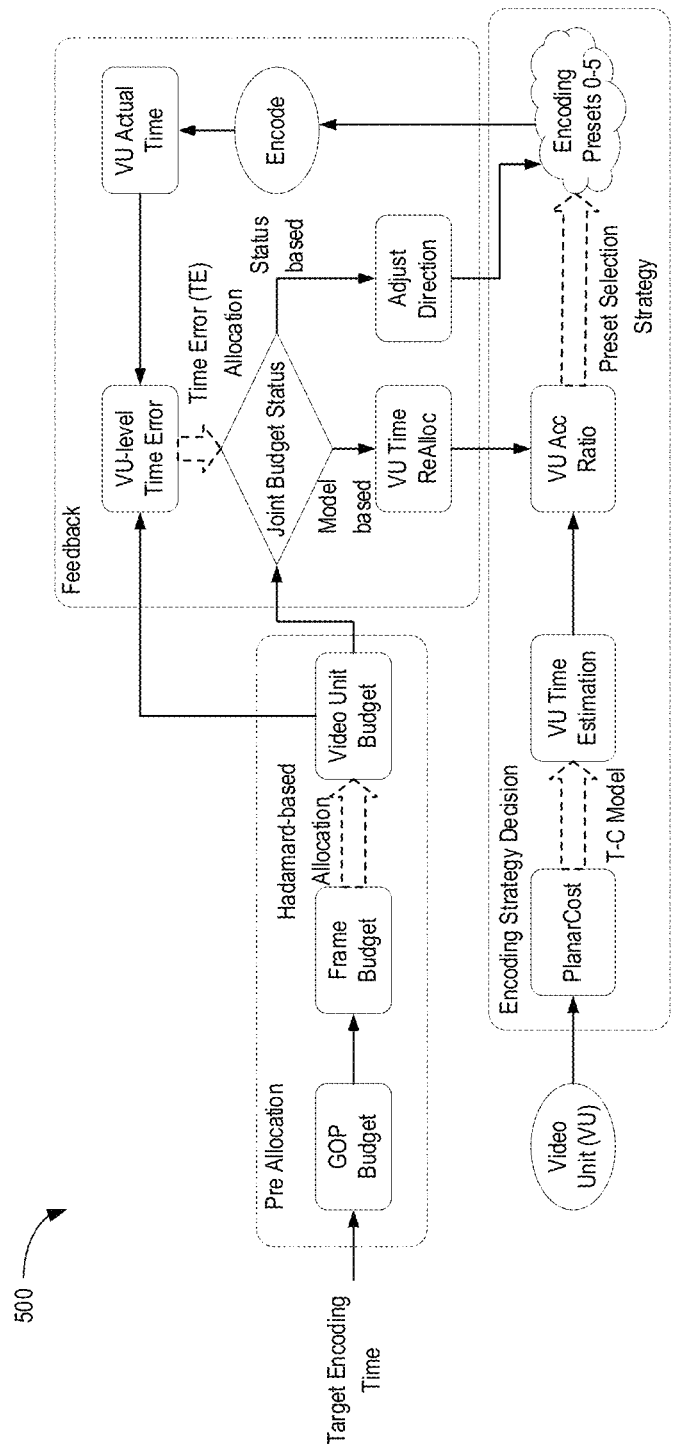
FIG. 5 illustrates a schematic diagram illustrating an overall complexity control scheme in accordance with some embodiments of the present disclosure.

1) Embodiment 1: This Embodiment Describes an Example of the Overall Design of the Complexity Control Scheme FIG. 5 illustrates a schematic diagram 500 illustrating an overall complexity control scheme in accordance with some embodiments of the present disclosure. Given the sequence target encoding time, the overall scheme aims to realize precise complexity control is shown in FIG. 5.

First, target encoding time will be gradually broken down to each level. Specifically, the time budget is equally allocated to each Group Of Pictures (GOP). Then the GOP budget is unequally allocated to each frame according to the Temporal ID (TID). Then the frame budget is unequally allocated to each video unit according to the SATD cost of the video unit, which is based on an 8×8 Hadamard transform. Through the pre-allocation process, the target encoding time is split into individual video unit's budgets. Then a video unit-level encoding strategy decision module is designed aims to realizing the video unit budget. In one example, Planar Cost, which is found to have a strong correlation with video unit encoding time, is utilized to construct a Time Cost (T-C) model. This model is then used to estimate video unit encoding time when default encoding search is conducted on the video unit. Afterward, an acceleration ratio of the current video unit can be derived, based on which a set of parameters (also, Presets) is selected from a series of predefined parameter sets. Alternatively, when Planarcost is not obtainable. For example, for Inter setting, the target and actual budget-consuming status are combined to give the guidance on selecting the preset for the following video units directly. Specifically, a preset with more encoding complexity or less complexity will be chosen.

In order to achieve precise encoding time control, a feedback module is designed. Wherein encoding time of each video unit is collected, and a video unit-level total time error is maintained and used to update the joint budget consuming status. Then the joint budget consuming status will be further utilized in the guidance of the encoding strategy decision module.

Figure 6:
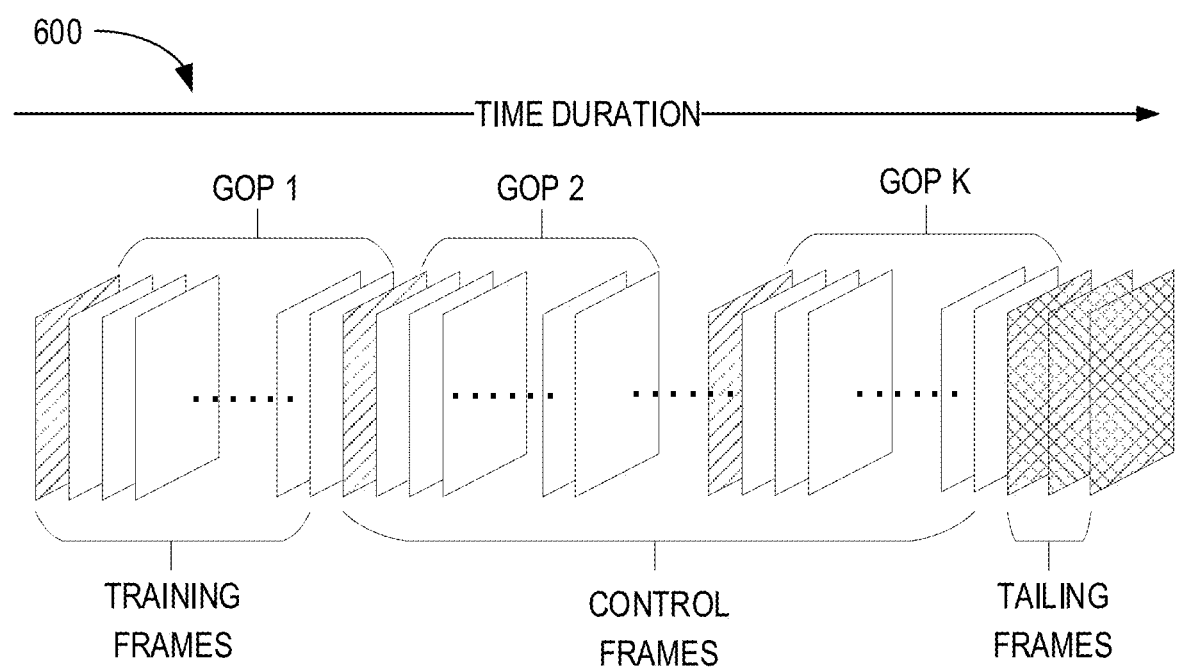
FIG. 6 illustrates an example weighted budget pre-allocation in accordance with some embodiments of the present disclosure.

2) Embodiment 2: This Embodiment Describes in the Pre-Allocation Module, an Example of how to Realize Weighted Budget Allocation The total budget of the sequence is firstly evenly assigned to each GOP. FIG. 6 illustrates an example weighted budget pre-allocation 600 in accordance with some embodiments of the present disclosure. When the total frame is not divisible by GOP size, tailing frames will appear at the end as FIG.

6. Let us denote the tailing frames as GOP K+1. In this case, the K+1 GOP will be allocated less encoding budget, depending on the frame number in the GOP.

Before the actual encoding time control process, one or more training frames may be needed to fit some online parameters. The existence of training frame is optional. For the AI setting, the sequence budget will be evenly allocated to each frame, so the training frame number could also be zero. The number of training frames is also optional. One or more GOPs could be selected for training under the RA setting. Therefore, the real encoding time of these training frames should be subtracted from the sequence budget during the pre-allocation process as (1). Then the budget of each GOP, for example, from GOP 2 to GOP K+1, will be obtained.

$$T_{GOPBudget} = \frac{T_{SeqBudget} - T_{TrainingFrames}}{Num_{SeqFrames}} \times Num_{GopFrames} \quad (1)$$

Then GOP budget will be broken down to the frame budget as (2). Here $\omega_{Frame}$ denotes the weight of each frame in the GOP.

$$T_{FrameBudget} = \frac{\omega_{Frame}}{\sum\limits_{GOP} \omega_{Frame}} \times T_{GOPBudget} \quad (2)$$

Figure 7A:
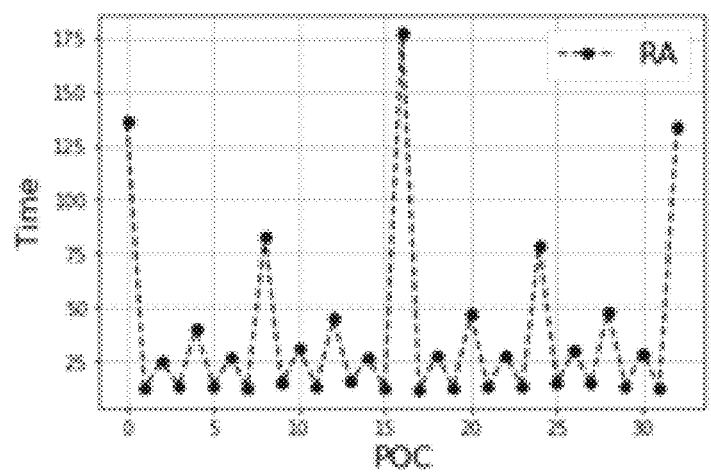
FIGS. 7A and 7B illustrate example diagrams of coding time fluctuation of frames in 2 GOPs in accordance with some embodiments of the present disclosure.
Figure 7B:
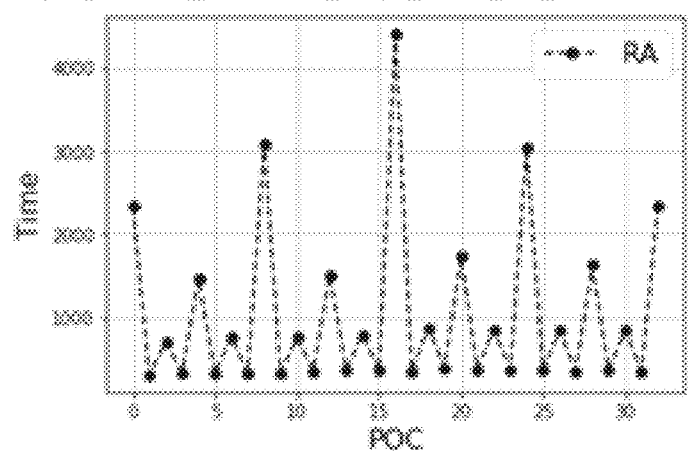

For the same sequence, the encoding time of frames at the same TID has shown some fixed relative relation. FIG. 7A illustrates example encoding time fluctuation 700 of frames in a GOP (labelled with Johnny) in accordance with some embodiments of the present disclosure. FIG. 7B illustrates another example encoding time fluctuation 750 of frames in a GOP (labelled with DaylightRoad2). Preliminary experiments, as shown in FIGS. 7A and 7B, verified the assumption. Johnny and DaylightRoad2 are encoded with RA setting with GOP size 16. Two GOPs are encoded, and the frame-level encoding time is collected and demonstrated in the figure. According to the figure, the encoding time consumption of the frames with the same TID shows evident stability, while for frames with different TID, there is a certain degree of separation.

In order to obtain the weight of each TID, training frames are set to collect the encoding time relationship (i.e., relative weight) of each TID. Considering the similarity of the GOPs in the same sequence, the weights obtained from the training frames can also be utilized to estimate the weight of each TID in the GOP for the following GOPs.

Similarly, the frame budget will be broken down to the video unit budget as (3). Here $\omega_{CTU}$ denotes the weight of each video unit in the frame. And $T_b$ denotes the time budget for the video unit.

$$T_b = \frac{\omega_{Video\,Unit}}{\sum\limits_{Frame} \omega_{Video\,Unit}} \times T_{FrameBudget} \quad (3)$$

For the sake of determining the weight of all video units in the whole frame before encoding, the sum of 8×8 Hadamard cost is chosen to be used, as shown in (4). Notably, the Hadamard costs are also calculated for the rectangle video units at the picture boundary, and video unit time budgets are allocated accordingly.

$$\omega_{Video\,Unit} = \sum_{Video\,Unit} \text{Hadamard}\,(8 \times 8 \text{ blocks in Video Unit}) \quad (4)$$

The pre-allocation process regards complexity as a factor impacting the final encoding time. Here the complexity is reflected by TID-related factors and Hadamard cost-based factors. Through this pre-allocation, Frames and video units with higher complexity will be allocated more time budget, which will avoid unreasonable acceleration ratio for those complex areas.

3) Embodiment 3: This his Embodiment Describes in the Encoding Strategy Decision Module, an Example of how to Use the Pareto-Based Method to Generate the Predefined Presets The Pareto principle states that for many outcomes, roughly 80% of consequences come from 20% of causes (the "vital few"). In the problem of obtaining the best parameter configuration for achieving target time saving with minimal RD loss. Pareto-efficient encoding configurations, identified through rate-distortion-complexity analysis, are conducted at first. The parameters that have obvious impaction on RD performance and encoding time are collected and picked out. For example, max/min CU depth and PU mode for HEVC, and max QT/BT/MT depth for VVC.

Figure 8:
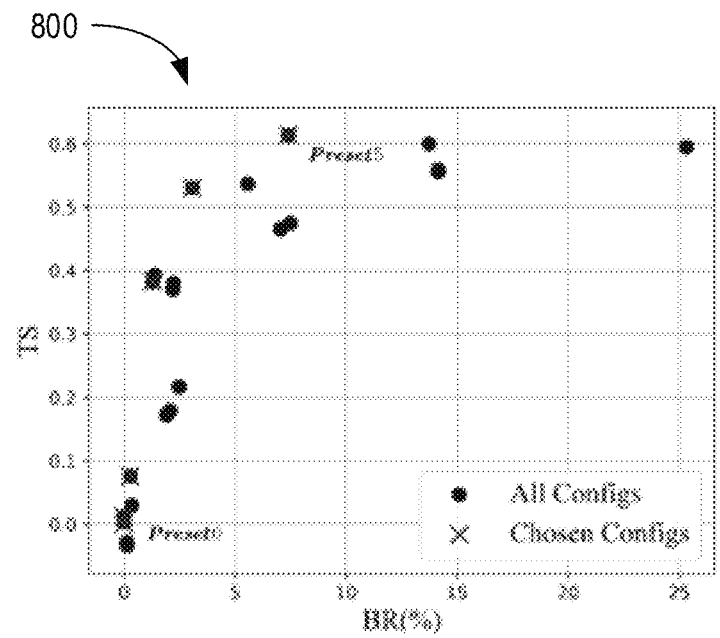
FIG. 8 illustrates an example Time saving and RD performance of the presets traversed in accordance with some embodiments of the present disclosure.

Here VVC Intra setting is taken as an example. The combinations of QT with maximum depths of {0, 1, 2, 3, 4}, BT of {0, 1, 2, 3, 4, 5} and MT of {0, 1, 2, 3} may be traversed. All sequences from Class C-E are tested to investigate the acceleration properties as regards time saving (TS) and RD loss (evaluated by Bjøntegaard delta bit-rate (BDBR), also shorted as BR). FIG. 8 illustrates an example Time saving and RD performance 800 of the presets traversed in accordance with some embodiments of the present disclosure. The Presets whose BDBR is higher than 30% is aborted for better presenting. The frontiers from FIG. 8, which means the best cost performance, are extracted to chosen configurations in Table 1 as our Pareto-efficient presets 0-5.

TABLE 1

THE CHOSEN FRONTIER PRESETS

| Preset | Maximum Depth | | | BDBR (%) | TS |
|---|---|---|---|---|---|
| | QT | BT | MT | | |
| 0 | / | / | / | 0.00 | 0.00% |
| 1 | 4 | 4 | 3 | 0.03 | 1.20% |
| 2 | 4 | 3 | 3 | 0.33 | 9.20% |
| 3 | 4 | 3 | 2 | 1.52 | 46.30% |
| 4 | 4 | 2 | 1 | 3.70 | 63.40% |
| 5 | 4 | 0 | 0 | 9.02 | 72.90% |

Here, the maximum QT/MT/BT combination is an example. Alternatively, min QT/BT/MT depth can also be added to compare the Pareto efficiency. Additionally, motion estimation range can also be regarded as a parameter for comparison. With more parameters selected in the candidate list for comparison, lower RD loss will probably be realized under the same time saving performance. Because this method does not constrain the specific parameter in the candidate list, this method can be extended to other video coding standards, for example, AV1, HEVC and H.264, by constructing the candidate parameter list and selecting the Pareto efficient ones through rate-distortion-complexity analysis.

4) Embodiment 4: This his Embodiment Describes an Example of how to Realize the Model-Based Method to Realize Encoding Strategy Decisions Here an example of how to conduct the encoding strategy decision is illustrated. Take VVC Intra setting as an example again. After Pareto principle-based analysis, two or more candidate presets can be obtained, where each preset corresponds to a TS ratio. This Embodiment will demonstrate the first method for selecting the proper preset for each video unit, i.e., the model-based method.

The central idea of the model-based method is video unit time budget reallocation with the help of a model predicting video unit encoding time when it is encoded under default configuration. Wherein an accurate model to estimate video unit encoding time under default configuration (i.e., original video unit time) is designed. To estimate encoding time priors to the real encoding process, Luma compress time of each video unit is collected. Different features are tried, and for the corresponding block, PlanarCost is found to have a strong correlation with its Luma compress time. An exponential relationship is observed, and therefore a Time-PlanarCost (viz. T-C) model is constructed as (5) where $\alpha$ and $\beta$ are sequences and QP-related parameters. In one example, these two parameters can be fitted offline. Alternatively, these two parameters can be fitted through the online process. The first one or more video units in the current sequence to be coded can be used to fit these parameters. Alternatively, the initial values of these two parameters can be fitted offline, but they update with a definite interval along with the encoding process. Moreover, $T_p$ denotes the original video unit time.

$$T_p = \alpha \times \text{PlanarCost}^\beta \quad (5)$$

The performance of the model-based method relies heavily on the accuracy of the model. Only when the original video unit time is precisely estimated the video unit time target may be converted, which is obtained through the joint consideration of the pre-allocation process and the budget consumption feedback, to acceleration ratio. To maintain the accurate characteristics of the model on different compiling or running environments, a factor $r_{epu}$ is designed to represent relative computing capability as below $$r_{cpu} = \frac{\sum_{CTUs\,NoAcc} T_r}{\sum_{CTUs\,NoAcc} T_p} \quad (6)$$

Where $T_r$ means real encoding time collected online, while $T_p$ is the predicted value from our T-C model. During encoding, CTUs not accelerated will be used to update this ratio. And the ratio will be immediately used to update the $\alpha$ as $$\hat{\alpha} = r_{cpu} \times \alpha \quad (7)$$

which will help continuously maintaining the accurate property of the model during encoding. Then the updated $\hat{\alpha}$ will be used to predict the original Luma compress time of the following video units as $$\hat{T}_p = \hat{\alpha} \times \text{PlanarCost}^\beta \quad (8)$$

On the other hand, the video unit budget obtained from (8) will be updated with $T_{fb}$, i.e., the time feedback to current video unit from previously accumulated time error.

$$T_a = T_b + T_{fb} \quad (9)$$

Here the updated video unit time budget is named as reallocated CTU time $T_a$. Combining allocated video unit time and predicted original video unit time, the target time ratio of the current video unit, i.e., $r_{Video\ Unit}$ will be derived as $$r_{Video\ Unit} = \frac{T_a}{T_p} \quad (10)$$

Then the preset in Table 1 closet to the acceleration ratio will be adopted to realize the target acceleration ratio.

5) Embodiment 5: This his Embodiment Describes an Example of how to Realize the Status-Based Method to Realize Encoding Strategy Decisions Here an example of how to conduct the encoding strategy decision is illustrated. Take VVC Intra setting as an example again. After Pareto principle-based analysis, two or more candidate presets can be obtained, where each preset corresponds to a TS ratio. This Embodiment will demonstrate the second method for selecting the proper preset for each video unit, i.e., the status-based method. The central idea is to modify the preset adjust direction according to the budget consuming status. Specifically, three data values, including target encoding time, accumulated budget consumption ratio, and accumulated actual time consumption ratio, are derived from the joint budget status module. Wherein accumulated actual time is updated as (11) after the encoding each video unit.

$$r_r = \frac{\sum_{CTUs\ Coded} T_r}{T_{SeqBudget}} \quad (11)$$

Here, $r_r$ denotes the actual overall consumption ratio of the accumulated video unit encoding time. Similarly, the accumulated budget is updated as (12) after encoding each video unit.

$$r_b = \frac{\sum_{CTUs\ Coded} T_b}{T_{SeqBudget}} \quad (12)$$

Here, the $r_b$ is an anchor consumption overall consumption ratio of the accumulated video unit encoding time. The anchor is obtained and fixed after the pre-analysis procedure. So, it can be referred to evaluate the encoding speed as (13), $$r_{speed} = \frac{r_r}{r_r} \quad (13)$$

where $r_{speed}$ represents the relative speed. If the $r_{speed}$ is greater than 1, then it means the actual budget consumption is higher than the target. In this case, the encoding speed of the following video units should be faster to fill the gap. The preset modification procedure can be defined as (14)

$$Preset_{New} = \begin{cases} Preset_{Old} - 1 & \text{if } (r_{speed} < 1 - thr) \\ Preset_{Old} & \text{if } (1 - thr \leq r_{speed} \leq 1 - thr) \\ Preset_{Old} + 1 & \text{if } (r_{speed} > 1 + thr) \end{cases} \quad (14)$$

Here, a higher threshold thr means less possibility to change the preset, while a lower threshold means the scheme is more sensitive to the deviation between the anchor budget consumption and the actual budget consumption. A lower threshold means more timely and accurate complexity control, but with more frequent preset switches. Lower threshold always rushes to solve immediate problems, which will easily lead to short-sightedness. In contrast, a higher threshold is long-sightedness, but possibly at the expense of complexity control accuracy.

To combine the advantage of both sides, an elastic threshold method is designed. Specifically, after obtaining the new preset $Present_{New}$, it will be confined to a preset range as (15)

$$Preset_{New} = Clamp(Preset_{New}, [Preset_{min}, Preset_{max}]) \quad (15)$$

Where $Preset_{min}$ is the minimal allowed preset, which represents the slowest encoding speed. While $Preset_{max}$ is the maximal allowed preset, which represents the fastest encoding speed. When the encoding time of the previous CTUs exceeds the threshold, the preset will switch inside the preset range. Only when a more significant value of deviation from the threshold is monitored will the preset range be adjusted as (16), $$[Preset_{min}, Preset_{max}] = \begin{cases} [Preset_{min}, Preset_{max}] - 1 & \text{if } (r_{speed} < 1 - thr2) \\ [Preset_{min}, Preset_{max}] + 1 & \text{if } (r_{speed} > 1 + thr2) \end{cases} \quad (16)$$

where the larger derivation threshold value thr2 is defined as $$thr2 = thr2 + \delta \cdot (1 - r_b) \quad (17)$$

wherein thr is a smaller threshold value. Wherein thr2 is a more significant threshold value. Wherein $\delta$ is in range (0,1), which represents the interval between these two thresholds. At the beginning of the encoding, thr2 and thr have the largest interval, which means the adjustment of the preset range is suppressed. By using this suppression method, more encoding time fluctuation is approved, which will help achieve a better RD performance of the encoder. When the encoding process approaches the end, thr2 gradually approach thr. In this case, a more frequent preset switch will be allowed to realize a precise complexity control.

Figure 9:
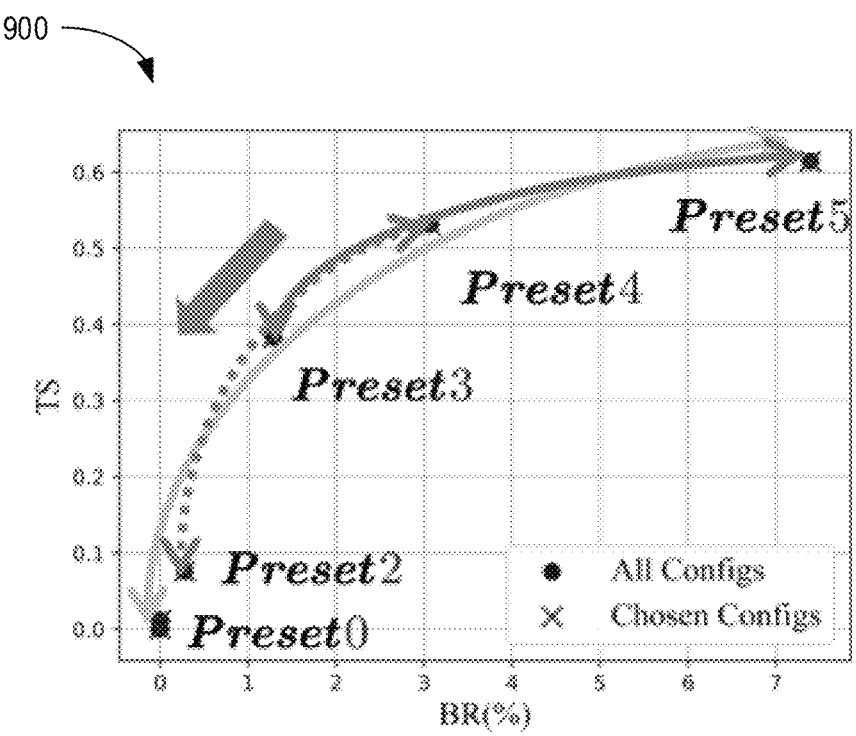
FIG. 9 illustrates an example diagram of an elastic threshold method in accordance with some embodiments of the present disclosure.

FIG. 9 illustrates an example diagram 900 of an elastic threshold method in accordance with some embodiments of the present disclosure. FIG. 9 compares the mechanisms of the preset switch of both the fixed threshold method and flexible threshold method. The arrow that covers from preset 0 to preset 5 represents the fixed threshold method. Considering the encoding time of a single video unit is less. A single video unit encoding time will not converge the overall encoding time to the target region quickly. Therefore, possibly the final selected preset will quickly switch to 0 or 5 and stay.

On the other hand, the elastic threshold method will constrain the selected preset in a range at first, for example, preset 3 to preset 5. Only when the overall encoding speed derivates quite far from the target will the preset range be adjusted from preset 2 to preset 4. This will give the change to digest fluctuations in encoding speed due to locally encoded content, which will avoid frequent preset switches and result in better RD performance.

6) Embodiment 6: This his Embodiment Describes an Example of how to Realize the Feedback Mechanism At the end of the encoding process of each video unit, the actually consumed time of the video unit $T_r$ can be obtained, which can be used to calculate time error $T_e$ as $$T_e = T_r - T_a \quad (18)$$

Before the encoding process of each video unit, the previous accumulated time error will be used to calculate the time error feedback as $$T_{fb} = \frac{\sum_{CTUs\ Coded} T_e}{N_{Window}} \quad (19)$$

where $N_{window}$ denotes the number of video unit used for error assignment. Smaller $N_{window}$ could make time fast convergence, but too strict a time limit would result in a higher RD loss. In one example, the anchor $N_{window}$ is set as 20. Alternatively, it can be any artificially specified positive integer. Furthermore, the number of left video unit CTUleft is also considered for the time error suppression when the encoding process is nearing the end.

$$N_{window} = \max(1, \min(CTUleft, N_{window})) \quad (20)$$

After determining $N_{window}$, time feedback $T_{fb}$ will be obtained and collected by the joint budget status module, which is used to update the time budget of the video unit to be encoded as (9), which will drive the model-based method to realize encoding strategy decision (Embodiment 4). Alternatively, $T_b$ and $T_r$ will be collected to the joint budget status module, which will drive the status-based method to realize encoding strategy decision (Embodiment 5).

7) Embodiment 7: This Embodiment Describes an Example of the Performance Evaluation of the Complexity Control Scheme This Embodiment will evaluate the effectiveness of the proposed complexity control mechanisms from two aspects, i.e., per-sequence complexity control accuracy and overall performance under target time. The framework is implemented in VTM10.0. Four QP values {22, 27, 32, 37} were chosen for compressing sequences from Class A1, A2, B, C, E of the JVET standard test set. Class D is excluded because the number of video units in a frame is too small. The AI setting is selected to show the complexity control performance.

The calculation of time saving (TS) over the original VTM10.0 is listed as $$TS = \frac{T_{VTM10.0} - T_{Proposed}}{T_{VTM10.0}} * 100\% \quad (21)$$

And time error ratio (TE) is used to calculate the time error ratio from the time budget of this sequence as $$TE = \frac{\left|\sum_{CTUs} T_r - T_{SeqBudget}\right|}{T_{SeqBudget}} * 100\% \quad (22)$$

All of the experiments are conducted on a workstation with Intel® Core™ i9-9900X CPU@3.50 GHz, 128 GB, Ubuntu 16.04.6 LTS operating system.

Figure 10A:
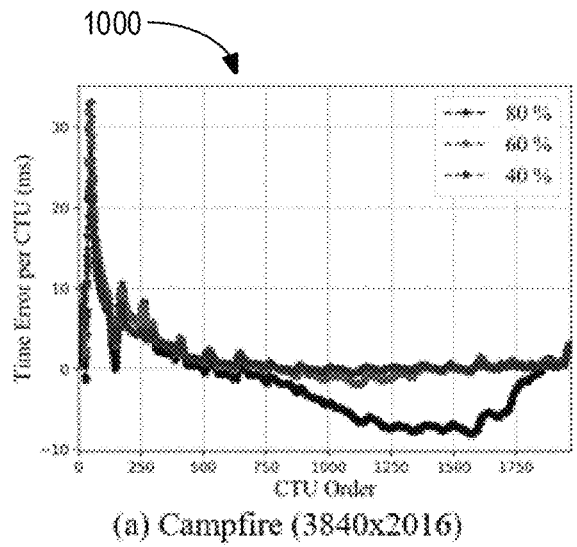
FIGS. 10A-10D illustrate example diagrams of the time error per CTU as encoding progresses in accordance with some embodiments of the present disclosure.
Figure 10B:
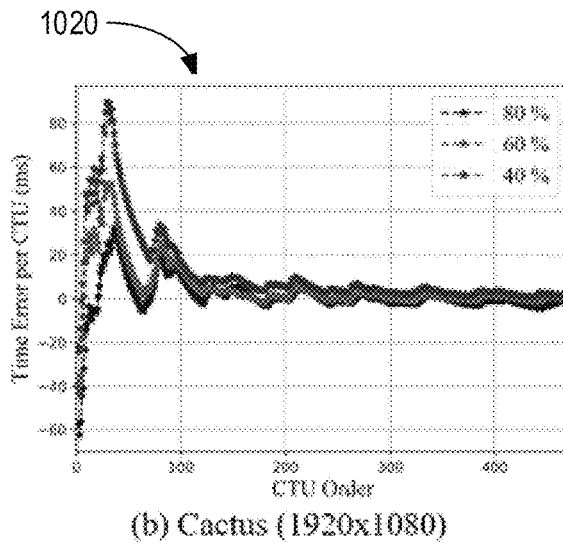
Figure 10C:
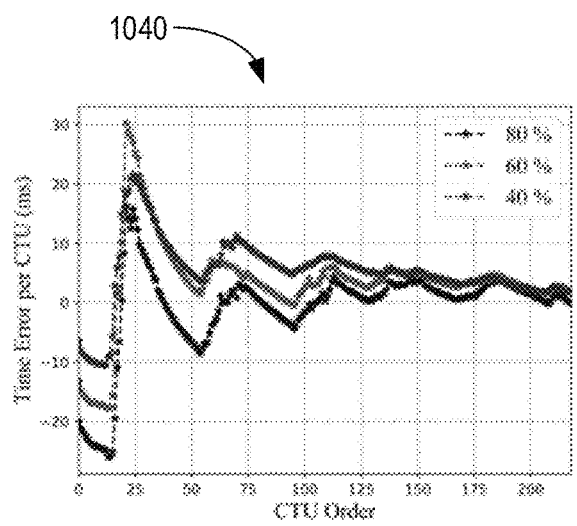
Figure 10D:
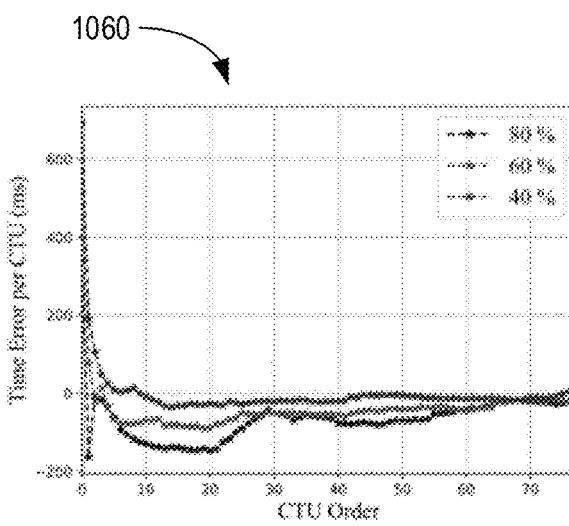

First, the primary indicator, i.e., the control accuracy of our complexity control framework, is evaluated by challenging the task to control the encoding time in one frame. Before testing, one frame of each test sequence is encoded by default VTM10.0 encoder, where Luma compress time is collected. Then a complexity ratio from 30% to 90% with an interval of 10% will be applied to derive target Luma compress time. The only information received by the redesigned VTM encoder is a specific target time, and the encoder will automatically analyze and choose QTMT depths of each video unit to approach the picture-level complexity budget. In the experiment, the viedo unit is set as CTU. Four sequences with different resolutions and three target encoding times (40%, 60% and 80% to original Luma compress time) are pick out as the representative to show the complexity control effects. FIG. 10A illustrates example diagram 1000 of the time error per CTU as encoding progresses in the example of (a) Campfire. FIG. 10B illustrates example diagram 1020 of the time error per CTU as encoding progresses in the example of (b) Cactus. FIG. 10C illustrates example diagram 1040 of the time error per CTU as encoding progresses in the example of (c) Johnny. FIG. 10D illustrates example diagram 1060 of the time error per CTU as encoding progresses in accordance with some embodiments of the present disclosure in the example of (d) PartyScene. FIGS. 10A-10D present as the CTUs are being encoded, the trend of accumulated $T_e$, divided by encoded CTU number. According to the figures, for sequences of different sizes and target encoding time, the average $T_e$ fluctuates at the beginning. Nevertheless, then the framework functions and average $T_e$ converges to nearly zero after around a quarter of the picture. This proves the framework has the ability to precisely control encoding time to target.

TABLE 2

Coding Performance under Target Complexity Reduction Ratio

| Target Luma Compress Time Ratio | BDBR (%) | TS | TE |
|---|---|---|---|
| 30% | 2.71 | 57.78% | 6.68% |
| 40% | 1.87 | 49.73% | 3.82% |
| 50% | 1.31 | 41.65% | 2.57% |
| 60% | 1.00 | 33.73% | 2.34% |
| 70% | 0.66 | 25.55% | 2.13% |
| 80% | 0.44 | 17.72% | 2.27% |
| 90% | 0.23 | 9.96% | 2.67% |
| AVERAGE | | | 3.21% |

Second, acceleration properties, i.e., time saving and RD loss, as well as complexity error, are evaluated in terms of TS, BDBR and TE, respectively. The same method to last part is used to set target Luma compress time. Table 2 demonstrates the average performance of all test sequences under a Luma compress time corresponding to 30%~90% of the original. According to Table 2, on average 3.21% TE is achieved, which means the encoding time of Luma compress process is precisely controlled to its target, i.e., from 30% to 90%. In general, TE is higher when the target time ratio is close to 30%. This is reasonable because the error ratio is calculated with respect to the time budget. A lower picture budget means a higher TE ratio. In addition, according to Table 1, 28.1% is an average encoding complexity ratio when preset 5 is adopted, so there could be some sequences whose complexity ratio can not reach 30% even if preset 5 is applied to all CTUs, which could also result in higher complexity error.

From the perspective of total encoding time, from 9.96% to 57.78% of overall encoding time reduction can be achieved under the BDBR loss from 0.23% to 2.71%. As a complexity control method, the acceleration performance is already comparable to the state-of-the-art complexity reduction algorithms.

Notably, the time saving and RD performance is achieved only by constraining the maximum depth of QTMT. Alternatively, better acceleration strategies can be adopted, for example, also constraining the minimum depth. Possibly better results can be expected.

7. FURTHER EMBODIMENTS

The embodiments of the present disclosure are related to coding time estimation and coding time adjustment. As used herein, the term "block" may represent a coding block (CB), a coding unit (CU), a prediction unit (PU), a transform unit (TU), a prediction block (PB), a transform block (TB).

Figure 11:
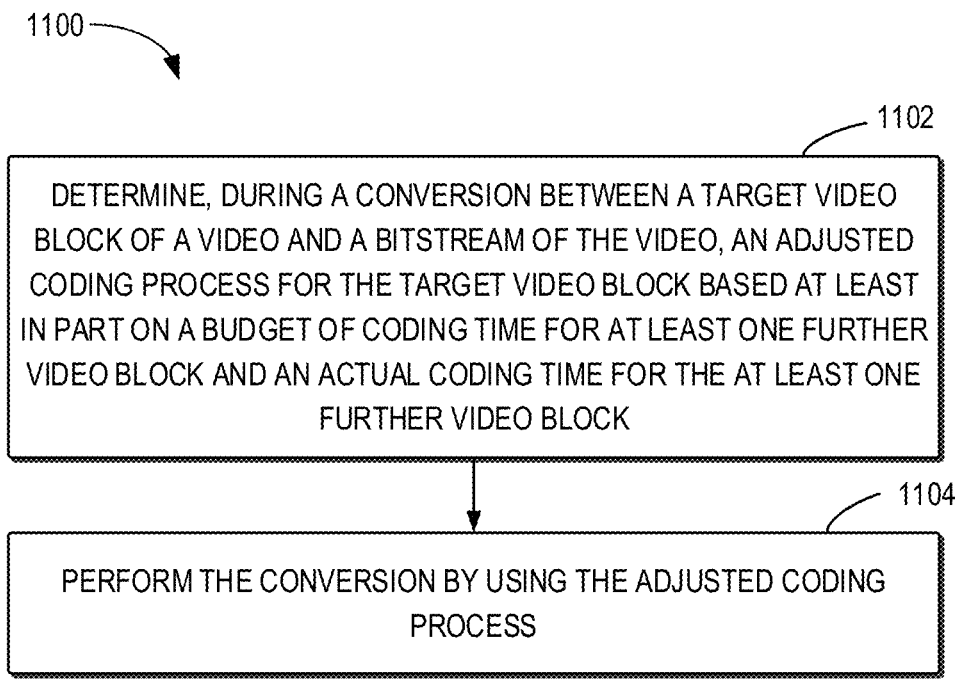
FIG. 11 illustrates a flowchart of a method for video processing in accordance with some embodiments of the present disclosure.

FIG. 11 illustrates a flowchart of a method 1100 for video processing in accordance with some embodiments of the present disclosure. The method 1100 may be implemented during a conversion between a target video block of a video and a bitstream of the video. As shown in FIG. 11, the method 1100 starts at 1102, where an adjusted coding process for the target video block is determined based at least in part on a budget of coding time for at least one further video block and an actual coding time for the at least one further video block. The at least one further video block is coded before the conversion. The coding time represents a time duration during which the at least one further video block being coded. The budget of coding time represents a time duration being pre-allocated for encoding the at least one further video block.

In some embodiments, the conversion may include encoding the target video block into the bitstream. In such cases, the coding time may comprise an encoding time, and the coding process may comprise an encoding process.

Alternatively, the conversion may include decoding the target video block from the bitstream. In such cases, the coding time may comprise a decoding time, and the coding process may comprise a decoding process.

As used hereinafter, the term "the target video block" may be also referred to as "the video processing unit". As used hereinafter, the adjustment of the coding process may also be referred to as a "complexity reduction process" or "complexity reduction algorithm".

At block 1104, the conversion between the target video block and the bitstream is performed. For example, the conversion may be performed by using the adjusted coding process.

According to embodiments of the present disclosure, it is proposed that the video encoding complexity can be controlled. For example, a budget of coding time may be pre-allocated for the target video block. The actual coding time may be conducted as feedback. By using the budget of coding time and the feedback actual coding time, the coding process for following video units will be adjusted. Such adjusted coding process can be used to improve the effectiveness of the prediction and thus improve the coding efficiency.

In some embodiments, the budget of coding time of the at least one further video block may be determined. For example, respective segment budgets of coding time for a plurality of segments of the video may be determined. For another example, respective frame budgets of coding time for a plurality of frames of the video may be determined. For a further example, respective video unit budgets of coding time for a plurality of video units of the video may be determined. The at least one further video target may comprise at least one segment, at least one frame, or at least one video unit. In other words, the pre-allocation of coding time may comprise three stages, i.e., segment stage, frame stage and video unit stage.

In some embodiments, for a segment, the segment budget may be determined based on the number of group of pictures (GOP) in the segment or the number of frames in the segment. For example, in the segment stage, the sequence encoding budget will be allocated to each segment. One segment will have one or more GOPs. The segment budget may be dependent on the number of GOP/frames.

In some embodiments, for a frame, the frame budget for the frame may be determined by allocating a segment budget of coding time for a segment to a set of frames in the segment based on respective weights of the set of frames. For example, in the frame stage, the GOP budget will be allocated to each frame.

In some embodiments, the respective weights of the set of frames may be determined based on coded information. For example, the coded information may comprise a slice type, a picture type, or a quantization parameter (QP).

Alternatively, or in addition, the respective weights for the set of frames may be adjusted during a further conversion between the at least one further video block and the bitstream and during the conversion between the target video block and the bitstream. In other words, the weight for each frame may be updated on the fly.

In some embodiments, for a video unit, the video unit budget may be determined by allocating a frame budget of coding time for a frame to a set of video units in the frame based on respective weights of the set of video units. For example, in the video unit stage, the frame budget will be allocated to each video unit.

In some embodiments, for a video unit in the set of video units, an intermediate feature of the video unit may be calculated during a conversion between the video unit and the bitstream. A weight of the video unit may be determined based on the intermediate feature. For example, the intermediate feature may comprise a gradient of the video unit, a variance of the video unit, or a sum of absolute transformed differences (SATD) of the video unit.

Alternatively, or in addition, in some embodiments, for a video unit of the set of video units, a weight of the video unit of the set of video units may be determined based on coded information. For example, the coded information may comprise spatial or temporal neighboring video units, or similar video units being historically traced.

In some embodiments, the budget of coding time for the at least one video block may be calculated based on a coding time allocation model. For example, the coding time allocation model may comprise a time-cost relationship model.

In some embodiments, the budget of coding time may be calculated based on one of: a sum of absolute transformed differences (SATD) cost, or a Planar cost.

In some embodiments, the coding time allocation model may comprise $\alpha * CTUcost^\beta$, where $\alpha$ represents a weighting parameter, CTUcost represents a cost of the first video block, and $\beta$ represents an exponential parameter. Alternatively, the coding time allocation model may comprise $\alpha * CTUcost^\beta + \gamma$, where $\alpha$ represents a weighting parameter, CTUcost represents a cost of the first video block, β represents an exponential parameter, and γ represents an offset parameter.

In some embodiments, as block 1102, a difference between the budget of coding time and the actual coding time for the at least one further video block may be determined. An coding process for the target video block may be adjusted based on the difference. By using such feedback mechanism, the accuracy property of the complexity reduction may be kept.

In some embodiments, the at least one video block comprises more than one video block. In determining the difference, a collected coding time of the at least one video block may be determined. A collected budget of coding time of the at least one video block may also be determined. The difference between the collected coding time and the collected budget of coding time may thus be determined. For example, each of the at least one video block comprises a video unit. Alternatively, each of the at least one video block comprises one of: a slice, a tile, a frame, or a group of pictures (GOP).

In this way, video unit-level (e.g., one video unit is a CTU) coding time will be collected and compared with the video unit-level budget after the coding process, which will help update the video unit-level encoding budget consuming status, namely joint budget status. Likewise, slice/tile/frame/GOP-level actual coding time may be collected to update the joint budget status.

In some embodiments, an adjustment direction for the target video block may be determined based on the difference. The adjustment direction indicates whether to accelerate the coding process or to slow down the coding process. The coding process for the target video block may be adjusted based on the adjustment direction. Alternatively, or in addition, in some embodiments, an acceleration ratio for the target video block may be determined based on the difference. The coding process for the target video block may be accelerated based on the acceleration ratio.

In this way, through the joint consideration of coding time budget and coding time error, the feedback may in a manner of either an acceleration ratio or the encoding strategy adjustment direction for the following video units.

In some embodiments, respective time differences for a plurality of unencoded video blocks in the video may be determined based on the difference. The plurality of unencoded video blocks comprise the target video block. The acceleration ratio may be determined based on the respective time difference of the target video block.

In some embodiments, the respective time differences may be determined by distributing the difference evenly or unevenly to the plurality of unencoded video blocks. For example, each of the plurality of unencoded video blocks may comprise a video unit, a frame, or a group of pictures (GOP). For example, the coding time deviation or time error may be maintained at video unit-level or frame/GOP level. The accumulated error will be evenly or unevenly distributed over the next few video units or next few frames/GOPs.

In some embodiments, a target budget consuming ratio may be determined based on the budget of coding time of the at least one video block and a total budget of coding time for the video. An actual budget consuming ratio may be determined based on the actual coding time of the at least one video block and the total budget of coding time for the video. An adjustment direction may be determined based on a ratio difference between the target budget consuming ratio and the actual budget consuming ratio. The adjustment direction indicates whether to accelerate the coding process or to slow down the coding process. The coding process may be adjusted based on the adjustment direction. In other words, the total budget consuming status, including the target budget consuming ratio and the actual one, are combined to calculate the current encoding speed, then the speed will be utilized to modify the encoding strategy adjustment direction.

In some embodiments, a target configuration of at least one factor for the coding process may be determined. The at least one factor comprises a plurality of configurations. The plurality of configurations have an influence on at least one of: a coding time and a rate distortion for the coding process.

In some embodiments, the at least one factor comprises a maximum partition depth used in a partition process for the target video block. For example, the maximum partition depth may be the only factor. The partition process is used in at least one of: a versatile video coding (VVC) standard, a high efficiency video coding (HEVC) standard, an intra video coding setting, or an inter video coding setting. Taking the VVC standard as an example, the maximum partition depth may comprise a QuadTree (QT), a Multi-type Tree (MT), or a Binary Tree (BT).

Alternatively, or in addition, in some embodiments, the at least one factor comprises a minimum partition depth used in a partition process for the target video block. In addition, the at least one factor may comprise at least one of: an intra prediction mode, an inter prediction mode, an intra block copy (IBC) prediction mode, a palette prediction mode, or a motion estimation range.

In some embodiments, the target configuration of the at least one factor may be generated by using a Pareto-based method. For example, the Pareto-based method may be used to generate the most Rate-Distortion-Complexity effective encoding strategy, i.e., presets, from the combination of the factors.

In some embodiments, a set of candidate configurations (also referred to as presets) may be determined from a plurality of configurations of the at least one factor. The target configuration may be selected from the set of candidate configurations. For example, respective performances of a plurality of configurations of the at least one factor may be determined based on respective time consuming or respective rate distortion (RD) losses of the plurality of configurations. The set of candidate configurations may be determined based on the respective performances of the plurality of configurations. Alternatively, or in addition, the set of candidate configurations of the at least one factor may be determined from offline training.

In some embodiments, the set of candidate configurations may be sorted in a rate distortion (RD) loss increasing order. The target configuration may be selected from the sorted set of candidate configurations. In other words, the presets will be arranged in RD loss increasing order.

Alternatively, or in addition, in some embodiments, a lookup table may be determined. The lookup table comprises the set of candidate configurations. Each of the set of candidate configurations is associated with a respective acceleration ratio and a respective rate distortion (RD) loss. The target configuration may be selected from the set of candidate configurations based on the lookup table. In other words, the lookup table may comprise all presets. For each preset, configuration of each factor, the corresponding coding time saving ratio, the corresponding RD loss may be contained.

In some embodiments, a target acceleration ratio may be determined based on the difference. A candidate configuration associated with an acceleration ratio being closest to the target acceleration ratio may be selected from the lookup table as the target configuration. In other words, the lookup table will be utilized to find the corresponding preset whose acceleration ratio is closest to the target acceleration ratio.

In some embodiments, an adjustment direction may be determined based on the difference. The adjustment direction indicates whether to accelerate the coding process or to slow down the coding process. The target configuration may be determined based on the adjustment direction and a first threshold. The target configuration is associated with an adjustment direction indicated by the determined adjustment direction. In other words, a first threshold may be utilized to decide to choose a faster or a slower preset.

In some embodiments, the set of candidate configurations comprise the plurality of configurations. In other words, all the presets will be available. Alternatively, in some embodiments, the set of candidate configurations comprise a subset of the plurality of configurations. That is, several presets will be available.

In some embodiments, the target configuration may be adjusted based on a second threshold. The adjusted target configuration may be associated with an adjustment direction indicated by the determined adjustment direction. In other words, the second threshold may be utilized to adjust the presets available to a faster or a slower range.

In some embodiments, the set of candidate configurations comprising a plurality of consecutive configurations within a predetermined range. That is, the presets may be several consecutive ones. Alternatively, the set of candidate configurations comprising a plurality of inconsecutive configurations. In other words, the presets may be inconsecutive.

In some embodiments, at least one of the first and second thresholds are predefined or empirical fixed. Alternatively, at least one of the first and second thresholds may be elastically adjusted. For example, at least one of the first and second thresholds may be adjusted during a further conversion between the at least one further video block and the bitstream and during the conversion between the target video block and the bitstream. In other words, an elastic one of these two thresholds are adjusted according to coding process.

In some embodiments, an unencoding ratio may be determined based on a set of video blocks being coded and a plurality of video blocks comprised in the video. At least one of the first and second thresholds may be adjusted based on the unencoding ratio and an adjustment parameter. For example, each video block may comprise a video unit, a frame, or a group of pictures (GOP).

In some embodiments, the adjustment parameter is greater than zero and less than one. Alternatively, or in addition, the first and second thresholds are correlated. For example, the first and second thresholds may be adjusted by using thr2=thr+$\delta$(1−$r_b$), where thr represents the first threshold, thr2 represents the second threshold, $r_b$ represents the unencoding ratio and $\delta$ represents the adjustment parameter.

In this way, according to the manner of the feedback, the encoding strategy decision is conducted through determining which preset to use for the following video units. The selected preset or the selected configurations of the factors may have a satisfying performance in the coding time and RD loss.

In some embodiments, a bitstream of a video may be stored in a non-transitory computer-readable recording medium. The bitstream of the video can be generated by a method performed by a video processing apparatus. According to the method, an adjusted encoding process for target video block of the video is determined based at least in part on a budget of encoding time for at least one further video block and an actual encoding time for the at least one further video block. The at least one further video block is encoded before the conversion. The encoding time represents a time duration during which the at least one further video block being encoded. The budget of encoding time represents a time duration being pre-allocated for encoding the at least one further video block. The bitstream may be generated by using the adjusted encoding process.

In some embodiments, an adjusted encoding process for target video block of the video is determined based at least in part on a budget of encoding time for at least one further video block and an actual encoding time for the at least one further video block. The at least one further video block is encoded before the conversion. The encoding time represents a time duration during which the at least one further video block being encoded. The budget of encoding time represents a time duration being pre-allocated for encoding the at least one further video block. The bitstream may be generated by using the adjusted encoding process. The bitstream may be stored in a non-transitory computer-readable recording medium.

Implementations of the present disclosure can be described in view of the following clauses, the features of which can be combined in any reasonable manner.

Clause 1. A method for video processing, comprising: determining, during a conversion between a target video block of a video and a bitstream of the video, an adjusted coding process for the target video block based at least in part on a budget of coding time for at least one further video block and an actual coding time for the at least one further video block, the at least one further video block being coded before the conversion, the coding time representing a time duration during which the at least one further video block being coded, the budget of coding time representing a time duration being pre-allocated for encoding the at least one further video block; and performing the conversion by using the adjusted coding process.

Clause 2. The method of clause 1, further comprising: determining the budget of coding time of the at least one further video block.

Clause 3. The method of clause 2, wherein determining the budget of coding time comprises at least one of: determining respective segment budgets of coding time for a plurality of segments of the video; determining respective frame budgets of coding time for a plurality of frames of the video; or determining respective video unit budgets of coding time for a plurality of video units of the video, wherein the at least one further video target comprises one of: at least one segment, at least one frame, or at least one video unit.

Clause 4. The method of clause 3, wherein determining a segment budget of coding time for a segment comprises: determining the segment budget by allocating a sequence encoding budget to the segment based on the number of group of pictures (GOP) in the segment or the number of frames in the segment.

Clause 5. The method of clause 3, wherein determining a frame budget of coding time for a frame comprises: allocating a segment budget of coding time for a segment to a set of frames in the segment based on respective weights of the set of frames.

Clause 6. The method of clause 5, further comprising: determining the respective weights of the set of frames based on coded information.

Clause 7. The method of clause 6, wherein the coded information comprises at least one of: a slice type, a picture type, or a quantization parameter (QP).

Clause 8. The method of clause 6, wherein determining the respective weights for the set of frames comprises: adjusting the respective weights for the set of frames during a further conversion between the at least one further video block and the bitstream and during the conversion between the target video block and the bitstream.

Clause 9. The method of clause 5, wherein determining a video unit budget of coding time for a video unit comprises: allocating a frame budget of coding time for a frame to a set of video units in the frame based on respective weights of the set of video units.

Clause 10. The method of clause 9, further comprising: for a video unit in the set of video units, calculating an intermediate feature of the video unit during a conversion between the video unit and the bitstream; and determining a weight of the video unit based on the intermediate feature.

Clause 11. The method of clause 10, wherein the intermediate feature comprises at least one of: a gradient of the video unit, a variance of the video unit, or a sum of absolute transformed differences (SATD) of the video unit.

Clause 12. The method of clause 9, further comprising: for a video unit of the set of video units, determining a weight of the video unit of the set of video units based on coded information.

Clause 13. The method of clause 12, wherein the coded information comprises at least one of: spatial or temporal neighboring video units, or similar video units being historically traced.

Clause 14. The method of clause 2, wherein determining the budget of coding time for the at least one video block comprises: calculating the budget of coding time based on a coding time allocation model.

Clause 15. The method of clause 14, wherein the coding time allocation model comprises a time-cost relationship model.

Clause 16. The method of clause 14 or clause 15, wherein calculating the budget of coding time comprises: calculating the budget of coding time based on one of: a sum of absolute transformed differences (SATD) cost, or a Planar cost.

Clause 17. The method of any of clauses 14-16, wherein the coding time allocation model comprises one of: $\alpha*CTUcost^\beta$, where $\alpha$ represents a weighting parameter, CTUcost represents a cost of the first video block, and $\beta$ represents an exponential parameter, or $\alpha*CTUcost^\beta+\gamma$, where $\alpha$ represents a weighting parameter, CTUcost represents a cost of the first video block, $\beta$ represents an exponential parameter, and $\gamma$ represents an offset parameter.

Clause 18. The method of any of clauses 1-17, wherein determining the adjusted coding process comprising: determining a difference between the budget of coding time and the actual coding time for the at least one further video block; and adjusting a coding process for the target video block based on the difference.

Clause 19. The method of clause 18, wherein the at least one video block comprises more than one video block, and wherein determining the difference comprises: determining a collected coding time of the at least one video block; determining a collected budget of coding time of the at least one video block; and determining the difference between the collected coding time and the collected budget of coding time.

Clause 20. The method of clause 19, wherein each of the at least one video block comprises a video unit.

Clause 21. The method of clause 19, wherein each of the at least one video block comprises one of: a slice, a tile, a frame, or a group of pictures (GOP).

Clause 22. The method of any of clauses 18-21, wherein adjusting the coding process of the target video block comprises: determining an adjustment direction for the target video block based on the difference, the adjustment direction indicating whether to accelerate the coding process or to slow down the coding process; and adjustment the coding process for the target video block based on the adjustment direction.

Clause 23. The method of any of clauses 18-21, wherein adjusting the coding process of the target video block comprises: determining an acceleration ratio for the target video block based on the difference; and accelerating the coding process for the target video block based on the acceleration ratio.

Clause 24. The method of clause 23, wherein determining the acceleration ratio for the target video block comprises: determining respective time differences for a plurality of unencoded video blocks in the video based on the difference, the plurality of unencoded video blocks comprising the target video block; and determining the acceleration ratio based on the respective time difference of the target video block.

Clause 25. The method of clause 24, wherein determining the respective time differences comprises: determining the respective time differences by distributing the difference evenly or unevenly to the plurality of unencoded video blocks.

Clause 26. The method of clause 24 or clause 25, wherein each of the plurality of unencoded video blocks comprises one of: a video unit, a frame, or a group of pictures (GOP).

Clause 27. The method of clause 22, wherein adjusting the coding process of the target video block comprises: determining a target budget consuming ratio based on the budget of coding time of the at least one video block and a total budget of coding time for the video; determining an actual budget consuming ratio based on the actual coding time of the at least one video block and the total budget of coding time for the video; determining an adjustment direction based on a ratio difference between the target budget consuming ratio and the actual budget consuming ratio, the adjustment direction indicating whether to accelerate the coding process or to slow down the coding process; and adjusting the coding process based on the adjustment direction.

Clause 28. The method of clause 22, wherein adjusting the coding process comprises: determining a target configuration of at least one factor for the coding process, the at least one factor comprising a plurality of configurations, the plurality of configurations having an influence on at least one of: a coding time and a rate distortion for the coding process.

Clause 29. The method of clause 28, wherein the at least one factor comprises a maximum partition depth used in a partition process for the target video block.

Clause 30. The method of clause 29, wherein the partition process is used in at least one of: a versatile video coding (VVC) standard, a high efficiency video coding (HEVC) standard, an intra video coding setting, or an inter video coding setting.

Clause 31. The method of clause 28 or clause 29, wherein for a versatile video coding (VVC) standard, the maximum partition depth comprises at least one of: a QuadTree (QT), a Multi-type Tree (MT), or a Binary Tree (BT).

Clause 32. The method of clause 28, wherein the at least one factor comprises a minimum partition depth used in a partition process for the target video block.

Clause 33. The method of clause 28, wherein the at least one factor comprises at least one of: an intra prediction mode, an inter prediction mode, an intra block copy (IBC) prediction mode, a palette prediction mode, or a motion estimation range.

Clause 34. The method of clause 28, wherein determining a target configuration of the at least one factor for the coding process comprises: generating the target configuration of the at least one factor by using a Pareto-based method.

Clause 35. The method of clause 28 or clause 34, wherein determining the target configuration of the at least one factor comprises: determining a set of candidate configurations from a plurality of configurations of the at least one factor; and selecting the target configuration from the set of candidate configurations.

Clause 36. The method of clause 35, wherein determining the set of candidate configurations comprises: determining respective performances of a plurality of configurations of the at least one factor based on respective time consuming or respective rate distortion (RD) losses of the plurality of configurations; and determining the set of candidate configurations based on the respective performances of the plurality of configurations.

Clause 37. The method of clause 35, wherein determining the set of candidate configurations comprises: determining the set of candidate configurations of the at least one factor from offline training.

Clause 38. The method of any of clauses 35-38, wherein selecting the target configuration comprises: sorting the set of candidate configurations in a rate distortion (RD) loss increasing order; and selecting the target configuration from the sorted set of candidate configurations.

Clause 39. The method of any of clauses 35-37, wherein selecting the target configuration comprises: determining a lookup table, the lookup table comprising the set of candidate configurations, each of the set of candidate configurations being associated with a respective acceleration ratio and a respective rate distortion (RD) loss; and selecting the target configuration from the set of candidate configurations based on the lookup table.

Clause 40. The method of clause 39, wherein selecting the target configuration comprises: determining a target acceleration ratio based on the difference; and selecting from the lookup table, a candidate configuration associated with an acceleration ratio being closest to the target acceleration ratio as the target configuration.

Clause 41. The method of any of clauses 35-37, wherein selecting the target configuration from the set of candidate configurations comprises: determining an adjustment direction based on the difference, the adjustment direction indicating whether to accelerate the coding process or to slow down the coding process; and determining the target configuration based on the adjustment direction and a first threshold, the target configuration being associated with an adjustment direction indicated by the determined adjustment direction.

Clause 42. The method of clause 41, wherein the set of candidate configurations comprise the plurality of configurations.

Clause 43. The method of clause 41, wherein determining the target configuration based on the comparison comprises: adjusting the target configuration based on a second threshold, the adjusted target configuration being associated with an adjustment direction indicated by the determined adjustment direction.

Clause 44. The method of clause 41, wherein the set of candidate configurations comprise a subset of the plurality of configurations.

Clause 45. The method of any of clauses 35-44, wherein the set of candidate configurations comprising a plurality of consecutive configurations within a predetermined range.

Clause 46. The method of any of clauses 35-44, wherein the set of candidate configurations comprising a plurality of inconsecutive configurations.

Clause 47. The method of any of clauses 43-46, wherein at least one of the first and second thresholds are predefined.

Clause 48. The method of any of clauses 43-46, further comprising: adjusting at least one of the first and second thresholds during a further conversion between the at least one further video block and the bitstream and during the conversion between the target video block and the bitstream.

Clause 49. The method of clause 48, wherein adjusting at least one of the first and second thresholds comprises: determining an unencoding ratio based on a set of video blocks being coded and a plurality of video blocks comprised in the video; and adjusting at least one of the first and second thresholds based on the unencoding ratio and an adjustment parameter.

Clause 50. The method of clause 49, wherein each video block comprises one of: a video unit, a frame, or a group of pictures (GOP).

Clause 51. The method of clause 49 or clause 50, wherein the adjustment parameter is greater than zero and less than one.

Clause 52. The method of any of clauses 49-51, wherein the first and second thresholds are correlated.

Clause 53. The method of any of clauses 49-51, wherein the first and second thresholds are adjusted using thr2=thr+$\delta \cdot (1-r_b)$, where thr represents the first threshold, thr2 represents the second threshold, $r_b$ represents the unencoding ratio and $\delta$ represents the adjustment parameter.

Clause 54. The method of any of clauses 1-53, wherein the conversion includes encoding the target video block into the bitstream.

Clause 55. The method of clause 54, wherein the coding time comprises an encoding time, and the coding process comprises an encoding process.

Clause 56. The method of any of clauses 1-53, wherein the conversion includes decoding the target video block from the bitstream.

Clause 57. The method of clause 56, wherein the coding time comprises an encoding time, and the coding process comprises an encoding process.

Clause 58. An apparatus for processing video data comprising a processor and a non-transitory memory with instructions thereon, wherein the instructions upon execution by the processor, cause the processor to perform a method in accordance with any of Clauses 1-57.

Clause 59. A non-transitory computer-readable storage medium storing instructions that cause a processor to perform a method in accordance with any of Clauses 1-57.

Clause 60. A non-transitory computer-readable recording medium storing a bitstream of a video which is generated by a method performed by a video processing apparatus, wherein the method comprises: determining an adjusted encoding process for target video block of the video based at least in part on a budget of encoding time for at least one further video block and an actual encoding time for the at least one further video block, the at least one further video block being encoded before the conversion, the encoding time representing a time duration during which the at least one further video block being encoded, the budget of encoding time representing a time duration being pre-allocated for encoding the at least one further video block; and generating the bitstream by using the adjusted encoding process.

Clause 61. A method for storing a bitstream of a video, comprising: determining an adjusted encoding process for target video block of the video based at least in part on a budget of encoding time for at least one further video block and an actual encoding time for the at least one further video block, the at least one further video block being encoded before the conversion, the encoding time representing a time duration during which the at least one further video block being encoded, the budget of encoding time representing a time duration being pre-allocated for encoding the at least one further video block; generating the bitstream by using the adjusted encoding process; and storing the bitstream in a non-transitory computer-readable recording medium.

Example Device

Figure 12:
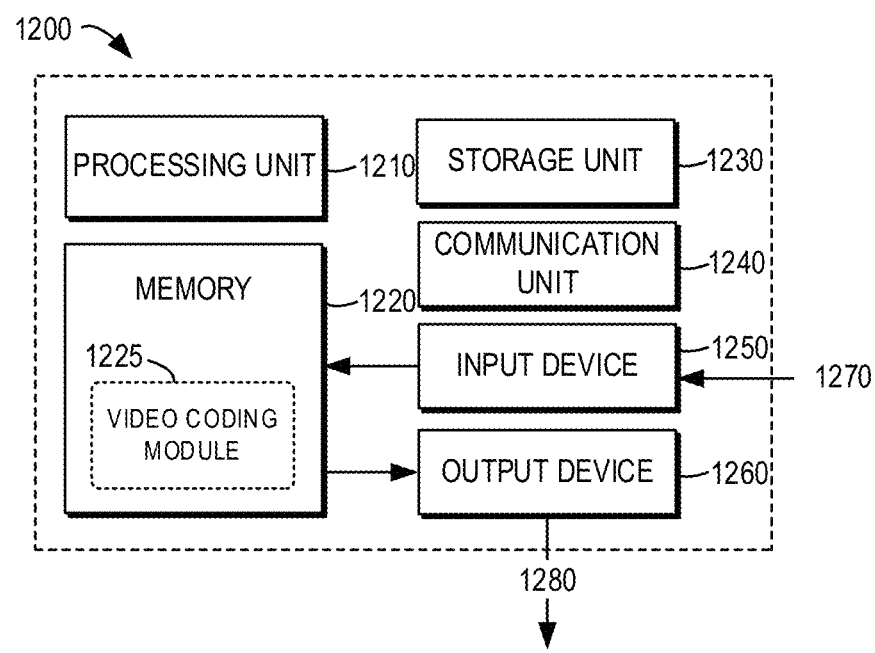
FIG. 12 illustrates a block diagram of a computing device in which various embodiments of the present disclosure can be implemented.

FIG. 12 illustrates a block diagram of a computing device 1200 in which various embodiments of the present disclosure can be implemented. The computing device 1200 may be implemented as or included in the source device 110 (or the video encoder 114 or 200) or the destination device 120 (or the video decoder 124 or 300).

It would be appreciated that the computing device 1200 shown in FIG. 12 is merely for purpose of illustration, without suggesting any limitation to the functions and scopes of the embodiments of the present disclosure in any manner.

As shown in FIG. 12, the computing device 1200 includes a general-purpose computing device 1200. The computing device 1200 may at least comprise one or more processors or processing units 1210, a memory 1220, a storage unit 1230, one or more communication units 1240, one or more input devices 1250, and one or more output devices 1260.

In some embodiments, the computing device 1200 may be implemented as any user terminal or server terminal having the computing capability. The server terminal may be a server, a large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, television receiver, radio broadcast receiver, E-book device, gaming device, or any combination thereof, including the accessories and peripherals of these devices, or any combination thereof. It would be contemplated that the computing device 1200 can support any type of interface to a user (such as "wearable" circuitry and the like).

The processing unit 1210 may be a physical or virtual processor and can implement various processes based on programs stored in the memory 1220. In a multi-processor system, multiple processing units execute computer executable instructions in parallel so as to improve the parallel processing capability of the computing device 1200. The processing unit 1210 may also be referred to as a central processing unit (CPU), a microprocessor, a controller or a microcontroller.

The computing device 1200 typically includes various computer storage medium. Such medium can be any medium accessible by the computing device 1200, including, but not limited to, volatile and non-volatile medium, or detachable and non-detachable medium. The memory 1220 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 1230 may be any detachable or non-detachable medium and may include a machine-readable medium such as a memory, flash memory drive, magnetic disk or another other media, which can be used for storing information and/or data and can be accessed in the computing device 1200.

The computing device 1200 may further include additional detachable/non-detachable, volatile/non-volatile memory medium. Although not shown in FIG. 12, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 1240 communicates with a further computing device via the communication medium. In addition, the functions of the components in the computing device 1200 can be implemented by a single computing cluster or multiple computing machines that can communicate via communication connections. Therefore, the computing device 1200 can operate in a networked environment using a logical connection with one or more other servers, networked personal computers (PCs) or further general network nodes.

The input device 1250 may be one or more of a variety of input devices, such as a mouse, keyboard, tracking ball, voice-input device, and the like. The output device 1260 may be one or more of a variety of output devices, such as a display, loudspeaker, printer, and the like. By means of the communication unit 1240, the computing device 1200 can further communicate with one or more external devices (not shown) such as the storage devices and display device, with one or more devices enabling the user to interact with the computing device 1200, or any devices (such as a network card, a modem and the like) enabling the computing device 1200 to communicate with one or more other computing devices, if required. Such communication can be performed via input/output (I/O) interfaces (not shown).

In some embodiments, instead of being integrated in a single device, some or all components of the computing device 1200 may also be arranged in cloud computing architecture. In the cloud computing architecture, the components may be provided remotely and work together to implement the functionalities described in the present disclosure. In some embodiments, cloud computing provides computing, software, data access and storage service, which will not require end users to be aware of the physical locations or configurations of the systems or hardware providing these services. In various embodiments, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The computing device 1200 may be used to implement video encoding/decoding in embodiments of the present disclosure. The memory 1220 may include one or more video coding modules 1225 having one or more program instructions. These modules are accessible and executable by the processing unit 1210 to perform the functionalities of the various embodiments described herein.

In the example embodiments of performing video encoding, the input device 1250 may receive video data as an input 1270 to be encoded. The video data may be processed, for example, by the video coding module 1225, to generate an encoded bitstream. The encoded bitstream may be provided via the output device 1260 as an output 1280.

In the example embodiments of performing video decoding, the input device 1250 may receive an encoded bitstream as the input 1270. The encoded bitstream may be processed, for example, by the video coding module 1225, to generate decoded video data. The decoded video data may be provided via the output device 1260 as the output 1280.

While this disclosure has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting.

We claim:

1. A method for video processing, comprising:
    determining, during a conversion between a target video block of a video and a bitstream of the video, an adjusted coding process for the target video block based at least in part on a budget of coding time for at least one further video block and an actual coding time for the at least one further video block, the at least one further video block being coded before the conversion, the coding time representing a time duration during which the at least one further video block being coded, the budget of coding time representing a time duration being pre-allocated for encoding the at least one further video block; and
    performing the conversion by using the adjusted coding process.

2. The method of claim 1, further comprising: determining the budget of coding time of the at least one further video block,
    wherein determining the budget of coding time comprises at least one of:
        determining respective segment budgets of coding time for a plurality of segments of the video;
        determining respective frame budgets of coding time for a plurality of frames of the video; or
        determining respective video unit budgets of coding time for a plurality of video units of the video,
    wherein the at least one further video target comprises one of: at least one segment, at least one frame, or at least one video unit.

3. The method of claim 2, wherein determining a segment budget of coding time for a segment comprises: determining the segment budget by allocating a sequence encoding budget to the segment based on the number of group of pictures (GOP) in the segment or the number of frames in the segment, or
    wherein determining a frame budget of coding time for a frame comprises: allocating a segment budget of coding time for a segment to a set of frames in the segment based on respective weights of the set of frames, or
    wherein determining a video unit budget of coding time for a video unit comprises: allocating a frame budget of coding time for a frame to a set of video units in the frame based on respective weights of the set of video units, or
    wherein the method further comprises: determining the respective weights of the set of frames based on coded information, wherein the coded information comprises at least one of: a slice type, a picture type, or a quantization parameter (QP).

4. The method of claim 3, wherein determining the respective weights for the set of frames comprises:
    adjusting the respective weights for the set of frames during a further conversion between the at least one further video block and the bitstream and during the conversion between the target video block and the bitstream, or
    wherein the method further comprises: for a video unit in the set of video units,
        calculating an intermediate feature of the video unit during a conversion between the video unit and the bitstream; and
        determining a weight of the video unit based on the intermediate feature, wherein the intermediate feature comprises at least one of: a gradient of the video unit, a variance of the video unit, or a sum of absolute transformed differences (SATD) of the video unit, or
    wherein the method further comprises: for a video unit of the set of video units, determining a weight of the video unit of the set of video units based on coded information, wherein the coded information comprises at least one of: spatial or temporal neighboring video units, or similar video units being historically traced.

5. The method of claim 2, wherein determining the budget of coding time for the at least one video block comprises: calculating the budget of coding time based on a coding time allocation model, wherein the coding time allocation model comprises a time-cost relationship model,
    wherein calculating the budget of coding time comprises: calculating the budget of coding time based on one of: a sum of absolute transformed differences (SATD) cost, or a Planar cost.

6. The method of claim 5, wherein the coding time allocation model comprises one of:
    $\alpha * CTUcost^\beta$, where $\alpha$ represents a weighting parameter, CTUcost represents a cost of the first video block, and $\beta$ represents an exponential parameter, or
    $\alpha * CTUcost^\beta + \gamma$, where $\alpha$ represents a weighting parameter, CTUcost represents a cost of the first video block, $\beta$ represents an exponential parameter, and $\gamma$ represents an offset parameter.

7. The method of claim 1, wherein determining the adjusted coding process comprising:
    determining a difference between the budget of coding time and the actual coding time for the at least one further video block; and
    adjusting a coding process for the target video block based on the difference, wherein the at least one video block comprises more than one video block, and wherein determining the difference comprises:
   determining a collected coding time of the at least one video block;
   determining a collected budget of coding time of the at least one video block; and
   determining the difference between the collected coding time and the collected budget of coding time, or
wherein each of the at least one video block comprises a video unit, or
wherein each of the at least one video block comprises one of: a slice, a tile, a frame, or a group of pictures (GOP).

8. The method of claim 7, wherein adjusting the coding process of the target video block comprises:
   determining an adjustment direction for the target video block based on the difference, the adjustment direction indicating whether to accelerate the coding process or to slow down the coding process; and
   adjustment the coding process for the target video block based on the adjustment direction, or
wherein adjusting the coding process of the target video block comprises:
   determining an acceleration ratio for the target video block based on the difference; and
   accelerating the coding process for the target video block based on the acceleration ratio,
wherein determining the acceleration ratio for the target video block comprises:
   determining respective time differences for a plurality of unencoded video blocks in the video based on the difference, the plurality of unencoded video blocks comprising the target video block; and
   determining the acceleration ratio based on the respective time difference of the target video block,
wherein determining the respective time differences comprises: determining the respective time differences by distributing the difference evenly or unevenly to the plurality of unencoded video blocks,
wherein each of the plurality of unencoded video blocks comprises one of: a video unit, a frame, or a group of pictures (GOP).

9. The method of claim 8, wherein adjusting the coding process of the target video block comprises:
   determining a target budget consuming ratio based on the budget of coding time of the at least one video block and a total budget of coding time for the video;
   determining an actual budget consuming ratio based on the actual coding time of the at least one video block and the total budget of coding time for the video;
   determining an adjustment direction based on a ratio difference between the target budget consuming ratio and the actual budget consuming ratio, the adjustment direction indicating whether to accelerate the coding process or to slow down the coding process; and
   adjusting the coding process based on the adjustment direction, or wherein adjusting the coding process comprises:
   determining a target configuration of at least one factor for the coding process, the at least one factor comprising a plurality of configurations, the plurality of configurations having an influence on at least one of: a coding time and a rate distortion for the coding process,
   wherein the at least one factor comprises a maximum partition depth used in a partition process for the target video block,
   wherein the partition process is used in at least one of: a versatile video coding (VVC) standard, a high efficiency video coding (HEVC) standard, an intra video coding setting, or an inter video coding setting.

10. The method of claim 9, wherein for a versatile video coding (VVC) standard, the maximum partition depth comprises at least one of: a QuadTree (QT), a Multi-type Tree (MT), or a Binary Tree (BT), or
wherein the at least one factor comprises a minimum partition depth used in a partition process for the target video block, or
wherein the at least one factor comprises at least one of: an intra prediction mode, an inter prediction mode, an intra block copy (IBC) prediction mode, a palette prediction mode, or a motion estimation range, or
wherein determining a target configuration of the at least one factor for the coding process comprises: generating the target configuration of the at least one factor by using a Pareto-based method, or
wherein determining the target configuration of the at least one factor comprises:
   determining a set of candidate configurations from a plurality of configurations of the at least one factor; and
   selecting the target configuration from the set of candidate configurations.

11. The method of claim 10, wherein determining the set of candidate configurations comprises:
   determining respective performances of a plurality of configurations of the at least one factor based on respective time consuming or respective rate distortion (RD) losses of the plurality of configurations; and
   determining the set of candidate configurations based on the respective performances of the plurality of configurations, or
wherein determining the set of candidate configurations comprises: determining the set of candidate configurations of the at least one factor from offline training, or
wherein selecting the target configuration comprises:
   sorting the set of candidate configurations in a rate distortion (RD) loss increasing order; and
   selecting the target configuration from the sorted set of candidate configurations, or
wherein selecting the target configuration comprises:
   determining a lookup table, the lookup table comprising the set of candidate configurations, each of the set of candidate configurations being associated with a respective acceleration ratio and a respective rate distortion (RD) loss; and
   selecting the target configuration from the set of candidate configurations based on the lookup table.

12. The method of claim 11, wherein selecting the target configuration comprises:
   determining a target acceleration ratio based on the difference; and
   selecting from the lookup table, a candidate configuration associated with an acceleration ratio being closest to the target acceleration ratio as the target configuration.

13. The method of claim 10, wherein selecting the target configuration from the set of candidate configurations comprises:
   determining an adjustment direction based on the difference, the adjustment direction indicating whether to accelerate the coding process or to slow down the coding process; and
   determining the target configuration based on the adjustment direction and a first threshold, the target configuration being associated with an adjustment direction indicated by the determined adjustment direction.

14. The method of claim 10, wherein the set of candidate configurations comprise the plurality of configurations, or
wherein determining the target configuration based on the comparison comprises: adjusting the target configuration based on a second threshold, the adjusted target configuration being associated with an adjustment direction indicated by the determined adjustment direction, or
wherein the set of candidate configurations comprise a subset of the plurality of configurations, or
wherein the set of candidate configurations comprising a plurality of consecutive configurations within a predetermined range, or
wherein the set of candidate configurations comprising a plurality of inconsecutive configurations, or
wherein at least one of the first and second thresholds are predefined.

15. The method of claim 14, further comprising:
adjusting at least one of the first and second thresholds during a further conversion between the at least one further video block and the bitstream and during the conversion between the target video block and the bitstream,
wherein adjusting at least one of the first and second thresholds comprises:
determining an unencoding ratio based on a set of video blocks being coded and a plurality of video blocks comprised in the video; and
adjusting at least one of the first and second thresholds based on the unencoding ratio and an adjustment parameter.

16. The method of claim 14, wherein each video block comprises one of: a video unit, a frame, or a group of pictures (GOP), or
wherein the adjustment parameter is greater than zero and less than one, or
wherein the first and second thresholds are correlated, or
wherein the first and second thresholds are adjusted using thr2=thr+δ·(1−$r_b$), where thr represents the first threshold, thr2 represents the second threshold, $r_b$ represents the unencoding ratio and δ represents the adjustment parameter.

17. The method of claim 1, wherein the conversion includes encoding the target video block into the bitstream, the coding time comprises an encoding time, and the coding process comprises an encoding process, or
wherein the conversion includes decoding the target video block from the bitstream, the coding time comprises a decoding time, and the coding process comprises a decoding process.

18. An apparatus for processing video data comprising a processor and a non-transitory memory with instructions thereon, wherein the instructions upon execution by the processor, cause the processor to:
determine, during a conversion between a target video block of a video and a bitstream of the video, an adjusted coding process for the target video block based at least in part on a budget of coding time for at least one further video block and an actual coding time for the at least one further video block, the at least one further video block being coded before the conversion, the coding time representing a time duration during which the at least one further video block being coded, the budget of coding time representing a time duration being pre-allocated for encoding the at least one further video block; and
perform the conversion by using the adjusted coding process.

19. A non-transitory computer-readable storage medium storing instructions that cause a processor to perform a method performed by a video processing apparatus, wherein the method comprises:
determining, during a conversion between a target video block of a video and a bitstream of the video, an adjusted coding process for the target video block based at least in part on a budget of coding time for at least one further video block and an actual coding time for the at least one further video block, the at least one further video block being coded before the conversion, the coding time representing a time duration during which the at least one further video block being coded, the budget of coding time representing a time duration being pre-allocated for encoding the at least one further video block; and
performing the conversion by using the adjusted coding process.

20. A non-transitory computer-readable recording medium storing a bitstream of a video which is generated by a method performed by a video processing apparatus, wherein the method comprises:
determining an adjusted encoding process for a target video block of the video based at least in part on a budget of encoding time for at least one further video block and an actual encoding time for the at least one further video block, the at least one further video block being encoded before the conversion, the encoding time representing a time duration during which the at least one further video block being encoded, the budget of encoding time representing a time duration being pre-allocated for encoding the at least one further video block; and
generating the bitstream by using the adjusted encoding process.

* * * * *